US007625280B2

(12) United States Patent
Singer et al.

(10) Patent No.: US 7,625,280 B2
(45) Date of Patent: Dec. 1, 2009

(54) GAMING DEVICE HAVING SEPARATELY AND SIMULTANEOUSLY DISPLAYED PAYLINES

(75) Inventors: Anthony M. Singer, Ringwood, NJ (US); Daniel M. Marks, Washington, DC (US); Joseph D. Masci, Montrose, NY (US); Howard M. Marks, Scarsdale, NY (US)

(73) Assignee: IGT, Reno, NV (US)

( * ) Notice: Subject to any disclaimer, the term of this patent is extended or adjusted under 35 U.S.C. 154(b) by 739 days.

(21) Appl. No.: 10/777,011

(22) Filed: Feb. 10, 2004

(65) Prior Publication Data

US 2004/0192431 A1 Sep. 30, 2004

Related U.S. Application Data

(60) Provisional application No. 60/445,769, filed on Feb. 10, 2003.

(51) Int. Cl.
*A63F 9/24* (2006.01)
*A63F 13/00* (2006.01)
*G06F 17/00* (2006.01)
*G06F 19/00* (2006.01)

(52) U.S. Cl. .............................. 463/20; 463/16; 463/25; 463/37; 273/143 R

(58) Field of Classification Search .................. 463/16, 463/20, 25, 37; 273/143 R
See application file for complete search history.

(56) References Cited

U.S. PATENT DOCUMENTS 4,621,814 A 11/1986 Stepan et al.
4,695,053 A 9/1987 Vazquez, Jr. et al.
4,805,907 A 2/1989 Hagiwara
4,838,552 A 6/1989 Hagiwara
4,856,787 A 8/1989 Itkis
4,926,327 A 5/1990 Sidley
4,991,848 A 2/1991 Greenwood et al.
5,046,736 A 9/1991 Bridgman et al.
5,088,737 A 2/1992 Frank et al.
5,275,400 A 1/1994 Weingardt et al.
5,342,047 A 8/1994 Heidel et al.
5,363,482 A 11/1994 Victor et al.

(Continued)

FOREIGN PATENT DOCUMENTS

EP 558307 A2 9/1993

(Continued)

OTHER PUBLICATIONS

Fifty Play Draw Poker Advertisement, written by IGT, available prior to Feb. 10, 2003.

(Continued)

*Primary Examiner*—Dmitry Suhol
*Assistant Examiner*—Jason Pinheiro
(74) *Attorney, Agent, or Firm*—K&L Gates LLP

(57) ABSTRACT

A video slot machine including a plurality of reels forming a single set of reels, a plurality of symbols on the reels, a plurality of different paylines associated with that set of reels, wherein the set of reels is separately and simultaneously displayed a plurality of times, and each different payline is displayed in association with one of the separate displays of the set of reels to enable a player to view and easily determine each of the winning symbol combinations that occur on the reels.

43 Claims, 13 Drawing Sheets

U.S. PATENT DOCUMENTS 5,375,830 A 12/1994 Takemoto et al.
5,542,669 A 8/1996 Charron et al.
5,580,053 A 12/1996 Crouch
5,580,055 A 12/1996 Hagiwara
5,611,535 A 3/1997 Tiberio
D392,340 S 3/1998 DeSimone
5,722,891 A * 3/1998 Inoue .......................... 463/20
5,732,950 A 3/1998 Moody
5,755,621 A 5/1998 Marks et al.
5,766,074 A 6/1998 Cannon et al.
5,772,509 A 6/1998 Weiss
5,807,172 A 9/1998 Piechowiak
5,823,873 A 10/1998 Moody
5,851,147 A 12/1998 Stupak et al.
5,882,105 A 3/1999 Barlow
5,890,962 A 4/1999 Takemoto
5,902,184 A 5/1999 Bennett
5,911,418 A 6/1999 Adams
5,934,672 A 8/1999 Sines et al.
5,941,770 A 8/1999 Miers et al.
5,951,397 A 9/1999 Dickinson
5,954,335 A 9/1999 Moody
5,967,894 A 10/1999 Kinoshita et al.
5,971,849 A 10/1999 Falciglia
D416,054 S 11/1999 McGahn et al.
5,976,016 A 11/1999 Moody et al.
5,980,384 A 11/1999 Barrie
5,984,781 A 11/1999 Sunaga
5,984,782 A 11/1999 Inoue
5,997,401 A 12/1999 Crawford
6,056,642 A 5/2000 Bennett
6,062,980 A 5/2000 Luciano
6,068,552 A 5/2000 Walker et al.
6,071,192 A 6/2000 Weiss
6,089,977 A 7/2000 Bennett
6,089,978 A 7/2000 Adams
6,093,102 A 7/2000 Bennett
6,098,985 A 8/2000 Moody
6,105,962 A 8/2000 Malavazos et al.
6,120,378 A 9/2000 Moody et al.
6,126,165 A 10/2000 Sakamoto
6,126,542 A 10/2000 Fier
6,129,357 A 10/2000 Wichinsky
6,132,311 A 10/2000 Williams
6,135,884 A * 10/2000 Hedrick et al. ................ 463/20
6,142,874 A 11/2000 Kodachi et al.
6,146,271 A 11/2000 Kadlic
6,149,156 A 11/2000 Feola
6,155,568 A 12/2000 Franklin
6,155,925 A 12/2000 Giobbi et al.
6,159,095 A 12/2000 Frohm et al.
6,186,894 B1 2/2001 Mayeroff
6,200,217 B1 3/2001 Osawa
6,203,428 B1 3/2001 Giobbi et al.
6,220,959 B1 4/2001 Holmes, Jr. et al.
6,224,483 B1 5/2001 Mayeroff
6,227,971 B1 5/2001 Weiss
6,231,442 B1 5/2001 Mayeroff
6,241,607 B1 6/2001 Payne et al.
6,261,178 B1 7/2001 Bennett
6,270,412 B1 * 8/2001 Crawford et al. .............. 463/20
6,309,299 B1 10/2001 Weiss
6,311,978 B1 11/2001 Moody
6,315,291 B1 11/2001 Moody
6,328,649 B1 12/2001 Randall et al.
6,334,613 B1 1/2002 Yoseloff
6,336,863 B1 * 1/2002 Baerlocher et al. ............ 463/20
6,358,147 B1 3/2002 Jaffe et al.
6,364,313 B1 4/2002 Moody
6,413,162 B1 7/2002 Baerlocher et al.
6,419,579 B1 7/2002 Bennett
6,517,074 B1 2/2003 Moody et al.
6,547,242 B1 4/2003 Sugiyama et al.
6,561,898 B2 5/2003 Moody
6,565,432 B2 5/2003 Moody
6,568,680 B1 5/2003 Moody et al.
6,604,999 B2 8/2003 Ainsworth
6,652,377 B1 11/2003 Moody
6,652,378 B2 * 11/2003 Cannon et al. ................ 463/20
6,656,044 B1 12/2003 Lewis
6,672,958 B2 1/2004 Bennett
6,695,695 B2 2/2004 Angel
6,695,696 B1 2/2004 Kaminkow
6,705,943 B2 3/2004 Awada
6,708,975 B1 3/2004 Fox et al.
6,722,655 B1 4/2004 Camero
6,832,957 B2 * 12/2004 Falconer ...................... 463/20
6,890,254 B2 5/2005 Kaminkow
2002/0002073 A1 1/2002 Montgomery et al.
2002/0016200 A1 * 2/2002 Baerlocher et al. ............ 463/20
2002/0082075 A1 * 6/2002 Meyer ......................... 463/20
2003/0017868 A1 * 1/2003 Crawford ..................... 463/20
2004/0038724 A1 * 2/2004 Asdale ........................ 463/20
2004/0043815 A1 * 3/2004 Kaminkow .................. 463/25
2004/0116173 A1 * 6/2004 Baerlocher ................... 463/16
2004/0137978 A1 * 7/2004 Cole et al. .................... 463/16
2004/0259627 A1 12/2004 Walker et al.
2005/0130733 A1 * 6/2005 Mierau et al. ................. 463/20
2005/0187011 A1 8/2005 Kaminkow

FOREIGN PATENT DOCUMENTS

GB 2083936 A * 3/1982
WO WO 98/00207 1/1998

OTHER PUBLICATIONS

Hundred Play Draw Poker Advertisement, written by IGT, dated 2002.
Jackpot Party Brochures and Articles, written by WMS Gaming, Inc., published in Mar. 1998.
Multiple Paylines may Vex some Players Article, written by Mark Pilarski, published in Best Bets, dated Dec. 24-30, 2003.
Playing for Keeps: Developing Casino Games Article, written by Steve Boelhouwer, published on www.gamasutra.com, dated Apr. 24, 2000.
Slot Machine Tips and Strategies Article, published on www.slotplayersworld.com (website Copyright 2000-2003), Nov. 24, 2003.
Totem Pole Advertisement, written by IGT, published in 1997.
Triple Play Draw Poker brochure, written by IGT, dated 1998.
Red Hot Roll Brochure (and Description) by Barcrest, Ltd.

* cited by examiner

FIG. 4

114 116

| SYMBOL COMBINATION | AWARD |
|---|---|
| A-A-A-A-A | 1,000 |
| B-B-B-B-B | 500 |
| C-C-C-C-C | 250 |
| D-D-D-D-D | 150 |
| E-E-E-E-E | 125 |
| F-F-F-F-F | 100 |
| G-G-G-G-G | 90 |
| A-A-A-A | 80 |
| B-B-B-B | 75 |
| C-C-C-C | 70 |
| D-D-D-D | 60 |
| E-E-E-E | 50 |
| F-F-F-F | 40 |
| G-G-G-G | 30 |
| A-A-A | 25 |
| B-B-B | 20 |
| C-C-C | 15 |
| D-D-D | 10 |
| E-E-E | 10 |
| F-F-F | 5 |
| G-G-G | 5 |

| FIG. 6A |
|---|
| FIG. 6B |

GAMING DEVICE HAVING SEPARATELY AND SIMULTANEOUSLY DISPLAYED PAYLINES

PRIORITY CLAIM

This application is a non-provisional patent application of and which claims priority to and the benefit of U.S. Provisional Patent Application Ser. No. 60/445,769, filed Feb. 10, 2003, which is incorporated herein.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND OF THE INVENTION

To play a conventional slot machine, a player deposits money in the form of coins, gaming tokens, paper currency or tickets either into a coin head or bill acceptor, respectively. The coins and gaming tokens are collected in a reservoir inside the gaming machine while the paper currency or ticket is collected in the bill acceptor inside the gaming machine. If the coins, gaming tokens, paper currency or ticket are validated as authentic, the player accrues the appropriate number of playing credits on a credit meter. For example, a twenty-five cent gaming machine will accrue four credits for each dollar deposited into the gaming machine.

After accruing credits on the credit meter, the player determines how many credits to wager on the next spin of the slot reels. The player causes the gaming device to spin the reels by pressing the spin button or by pulling a handle. When the reels stop spinning, symbols are displayed in symbol positions on the reels and awards are provided to a player based on designated symbol combinations indicated in a paytable or award summary table.

More specifically, slot machines include a symbol matrix which includes symbols displayed on three or more of the reels (also called “columns” or “reel columns”) that are adjacent to each other. The resulting matrix of symbols typically ranges from three columns by three rows with nine total symbols, to five columns by three rows with fifteen total symbols. Each position in the symbol matrix is referenced by column, from left to right, and row, from the top to bottom (“symbol positions”). For example: symbol position 1/2 is located in column 1 and row 2.

Players collect credits for predetermined winning symbol combinations that appear in specific or designated symbol positions on the reels. The combination of these designated symbol positions are generally referred to as “paylines.”

Conventional gaming devices initially included only one payline and provided credits for any winning symbol combinations occurring on that payline. Over time, the number of paylines associated with the reels increased to provide players with several different opportunities to obtain winning symbol combinations. For example in FIG. 3, the gaming device includes a set of reels 100 including five reels 54*a*, 54*b*, 54*c*, 54*d* and 54*e* having symbols 102. Five different paylines 52*a*, 52*b*, 52*c*, 52*d* and 52*e* are associated with the reels where the paylines extend horizontally and diagonally across the reels and intersect and overlap each other. Many conventional video reel gaming devices have even more paylines such as nine paylines, fifteen paylines, twenty paylines, twenty-five paylines or even more paylines associated with the reels.

In such video slot machines, when a winning combination of symbols occurs on one of the paylines or winning combinations of symbols occurs on a couple of these paylines, the win on each payline is simultaneously displayed. The player can usually read and easily understand the win on each payline and the amount won on each payline. When winning combinations of symbols occur on many, most or all of the paylines the win on each payline is simultaneously displayed. With games having nine, fifteen, twenty or twenty-five or more paylines, these paylines cover up a substantial portion of the screen, block the player’s view of the symbols which resulted in the winning combinations and are generally more difficult to understand how the wins occurred. Thus, while the player enjoys the wins on many paylines, for some players it is difficult to understand why and how each of the wins occurred due to these intersecting and overlapping paylines.

Accordingly, there is a need for new gaming devices which make viewing and determining winning symbol combinations on paylines and the individual wins associated with those paylines easier for players.

SUMMARY OF THE INVENTION

The present invention relates generally to a slot or reel game and more particularly, to a video slot machine including a plurality of reels forming a single set of reels, a plurality of symbols on the reels, a plurality of different paylines associated with that set of reels, wherein the set of reels is separately and simultaneously displayed a plurality of times, and each different payline is displayed in association with one of the separate displays of the set of reels to enable a player to view and easily determine each of the winning symbol combinations that occur on the paylines and the award associated with each winning combination.

More specifically, the gaming device includes a game having a set of reels and a plurality of different paylines associated with the set of reels. The set of reels is simultaneously and separately displayed to the player a plurality of times, preferably equal to the number of different paylines associated with the reels. Each separate display of the reels has one of the paylines displayed in association with said set of reels. It should be appreciated that any suitable number of paylines (and accordingly displays of the reel set) may be employed in accordance with the present invention. When the player activates or spins or causes the set of reels to be activated or spin (such as by placing a wager) the reels in the reel set spin. The spinning of the reels in the reels set is separately and simultaneously displayed. When the reels stop spinning, the paylines indicate the different symbol combinations associated with reel set. The gaming device then determines the different winning symbol combinations indicated on each of the paylines and provides an award for each winning symbol combination indicated on those paylines as in a conventional video slot machine. However, each winning combination is indicated separately and simultaneously in the display for the payline on which the winning combination occurred. The gaming device sums any awards and provides a total award for that spin to the player.

As described above, the present invention enhances a player’s experience with the game by enabling the player to easily and quickly view and determine the different symbol combinations on each of the paylines in the game. The present invention decreases player confusion by separately displaying the different paylines and wins or losses associated with each of the paylines, and thereby increases a player's excitement and enjoyment of the game as they watch the same reel set displayed separately and simultaneously to separately and simultaneously indicate different winning symbol combinations resulting from a spin.

In one slot embodiment, the gaming device includes an input device that enables the player to enter wager amounts for the paylines in a conventional manner. In one embodiment, the player wagers on the paylines in sequential order based on the payline order or numbers. For example, the player's first wager is placed on payline one, the player's second wager is placed on payline two and the players third wager is placed on payline three. The player may wager on one payline, a plurality of paylines or all of the paylines for a spin.

In one embodiment, the plurality of displays of the same reel set are displayed on the same display device and are configured or arranged in any suitable location or locations on the display device. In another embodiment, at least one display of the reel set is displayed on a separate display device. It should be appreciated that the displays of the reel set with the different paylines may be displayed on the same display device or on two or more different display devices.

In one alternative embodiment, the gaming device provides a bonus or additional award(s) or payout(s) for certain events occurring on one or more of the different paylines. In one embodiment, the bonus or additional award is provided to a player when a designated number or percentage of the paylines indicate winning symbol combinations. In another embodiment, the gaming device provides a bonus or additional award for winning symbol combinations occurring on specific paylines or in a display of the reel set in a specific location or configuration on the display device (i.e., all of the paylines associated with the reel set in one column, row or diagonal on the display device indicate winning symbol combinations). In another embodiment, the gaming device provides an input device or selector that enables a player to select one or more of the paylines prior to activating the reel set. The gaming device provides an additional award to the player when one or more of the paylines selected by the player indicate winning symbol combinations in a spin.

The present invention maybe employed in a primary game, a secondary or bonus game, or any other suitable symbol type of game.

It is therefore an advantage of the present invention to provide a gaming device that includes a plurality of different paylines associated with a single reel set, wherein the display device separately and simultaneously displays the reel set and each display of the reel set including a different one of the plurality of different paylines to enable a player to easily and quickly view and determine different symbol combinations and associated winning amounts indicated on the different paylines in a spin.

Additional features and advantages of the present invention are described in, and will be apparent from, the following Detailed Description of the Invention and the figures.

BRIEF DESCRIPTION OF THE DRAWINGS

FIG. 4 is a schematic diagram of a paytable associated with different symbol combinations occurring on the reels.

DETAILED DESCRIPTION OF THE INVENTION

Figure 1A:
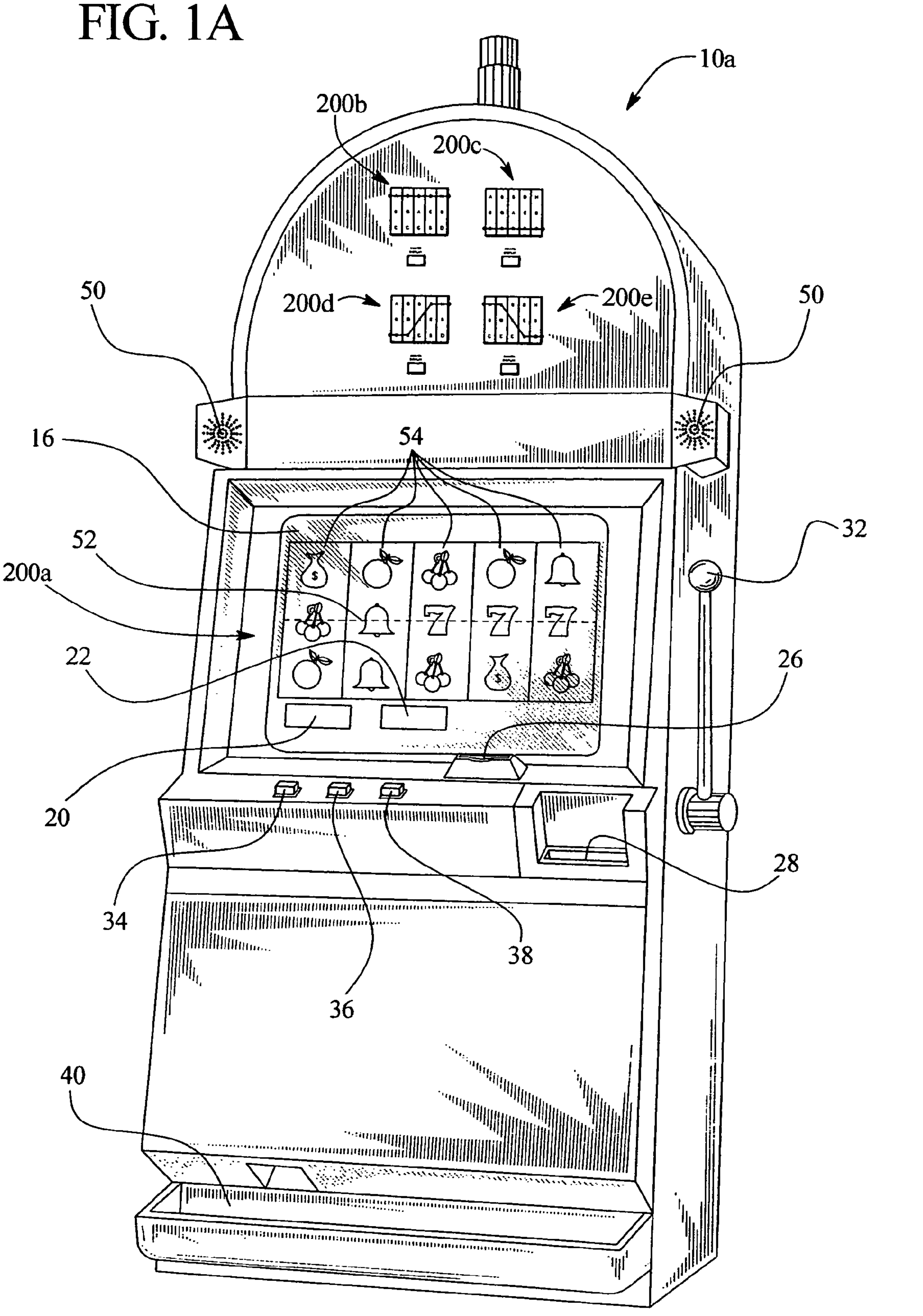
FIG. 1A is a front perspective view of one embodiment of the gaming device of the present invention.
Figure 1B:
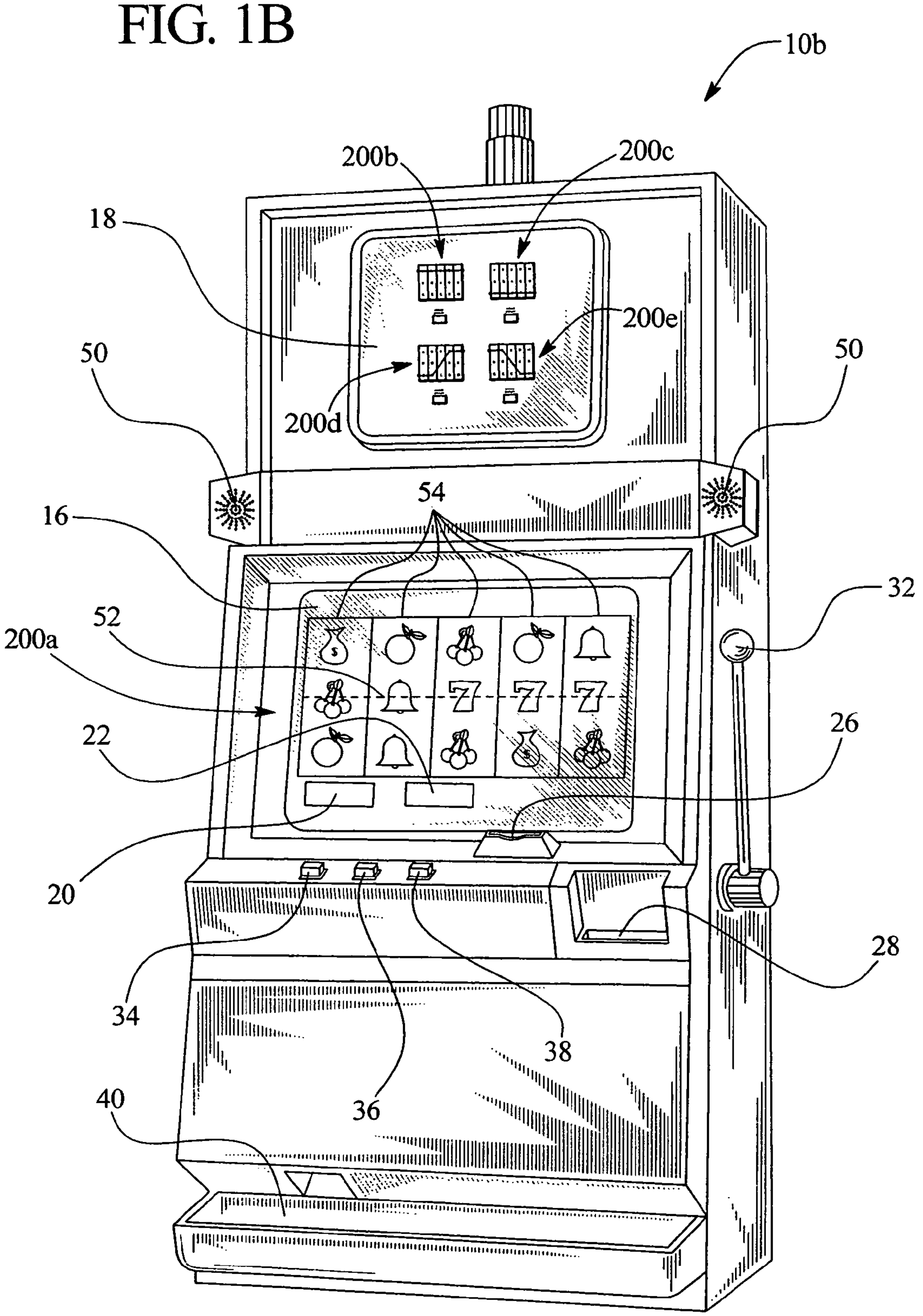
FIG. 1B is a front perspective view of another embodiment of the gaming device of the present invention.

Referring now to the drawings, two alternative embodiments of the gaming device of the present invention are illustrated in FIGS. 1A and 1B as gaming device 10*a* and gaming device 10*b*, respectively. Gaming device 10*a* and/or gaming device 10*b* are generally referred to herein as gaming device 10.

In one embodiment, as illustrated in FIGS. 1A and 1B, gaming device 10 has a support structure, housing or cabinet which provides support for a plurality of displays, inputs, controls and other features of a conventional gaming machine. It is configured so that a player can operate it while standing or sitting. The gaming device may be positioned on a base or stand or can be configured as a pub-style table-top game (not shown) which a player can operate preferably while sitting. As illustrated by the different configurations shown in FIGS. 1A and 1B, the gaming device can be constructed with varying cabinet and display configurations.

Figure 2A:
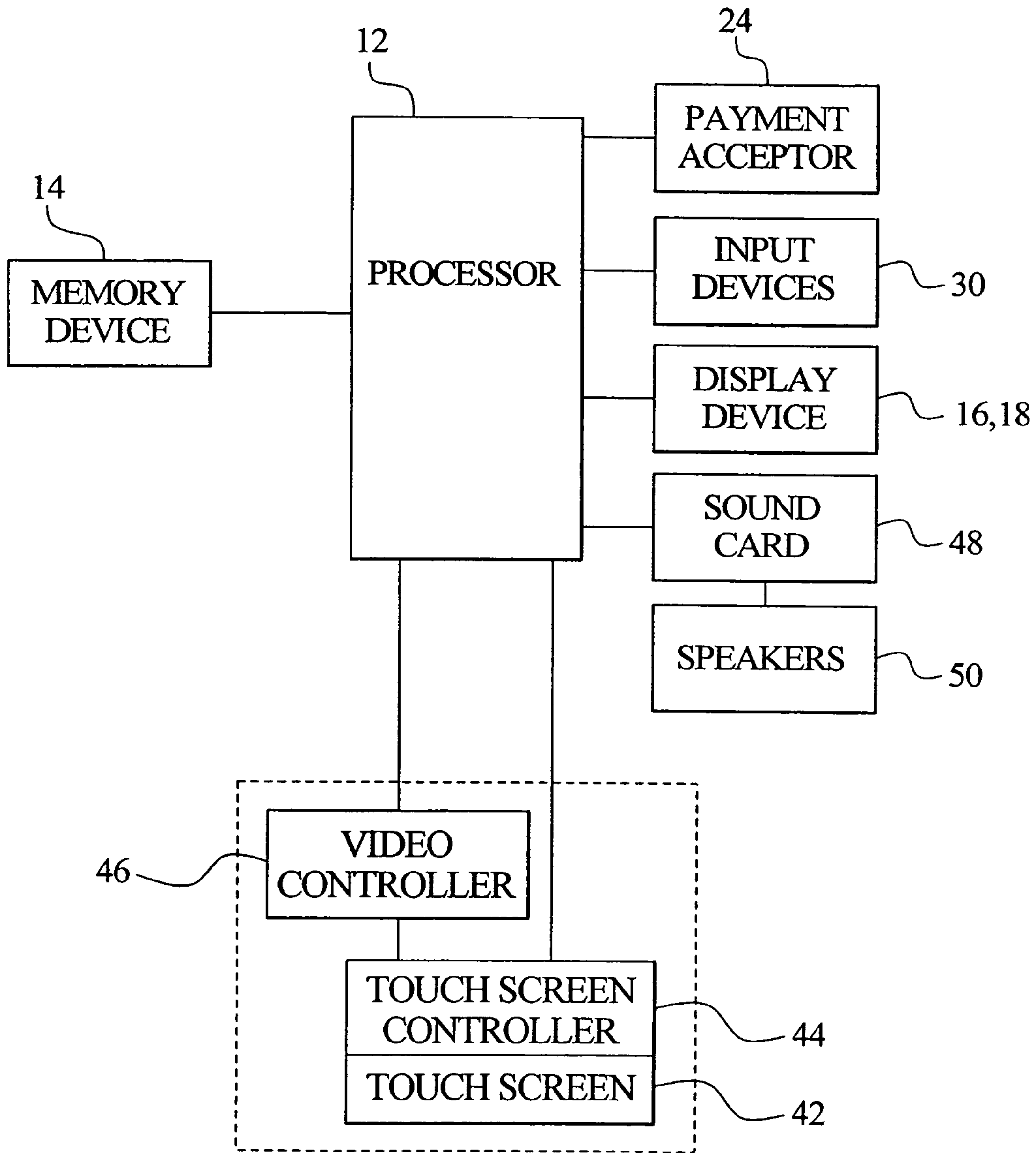
FIG. 2A is a schematic block diagram of the electronic configuration of one embodiment of the gaming device of the present invention.

In one embodiment, as illustrated in FIG. 2A, the gaming device preferably includes at least one processor 12, such as a microprocessor, a microcontroller-based platform, a suitable integrated circuit or one or more application-specific integrated circuits (ASIC's). The processor is in communication with or operable to access or to exchange signals with at least one data storage or memory device 14. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or information and applicable game rules that relate to the play of the gaming device. In one embodiment, the memory device includes random access memory (RAM). In one embodiment, the memory device includes read only memory (ROM). In one embodiment, the memory device includes flash memory and/or EEPROM (electrically erasable programmable read only memory). Any other suitable magnetic, optical and/or semiconductor memory may be implemented in conjunction with the gaming device of the present invention.

In one embodiment, part or all of the program code and/or operating data described above can be stored in a detachable or removable memory device, including, but not limited to, a suitable cartridge, disk or CD ROM. A player can use such a removable memory device in a desktop, a laptop personal computer, a personal digital assistant (PDA) or other computerized platform. The processor and memory device may be collectively referred to herein as a "computer" or "controller."

In one embodiment, as discussed in more detail below, the gaming device randomly generates awards and/or other game outcomes based on probability data. That is, each award or other game outcome is associated with a probability and the gaming device generates the award or other game outcome to be provided to the player based on the associated probabilities. In this embodiment, since the gaming device generates outcomes randomly or based upon a probability calculation, there is no certainty that the gaming device will ever provide the player with any specific award or other game outcome.

In another embodiment, as discussed in more detail below, the gaming device employs a predetermined or finite set or pool of awards or other game outcomes. In this embodiment, as each award or other game outcome is provided to the player, the gaming device removes the provided award or other game outcome from the predetermined set or pool. Once removed from the set or pool, the specific provided award or other game outcome cannot be provided to the player again. This type of gaming device provides players with all of the available awards or other game outcomes over the course of the play cycle and guarantees the amount of actual wins and losses.

In one embodiment, as illustrated in FIG. 2A, the gaming device includes one or more display devices controlled by the processor. The display devices are preferably connected to or mounted to the cabinet of the gaming device. The embodiment shown in FIG. 1A includes a central display device 16 which displays a primary game. This display device may also display any secondary game associated with the primary game as well as information relating to the primary or secondary game. The alternative embodiment shown in FIG. 1B includes a central display device 16 and an upper display device 18. The upper display device may display the primary game, any suitable secondary game associated with the primary game and/or information relating to the primary or secondary game. As seen in FIGS. 1A and 1B, in one embodiment, gaming device includes a credit display 20 which displays a player's current number of credits, cash, account balance or the equivalent. In one embodiment, gaming device includes a bet display 22 which displays a player's amount wagered.

The display devices may include, without limitation, a monitor, a television display, a plasma display, a liquid crystal display (LCD) a display based on light emitting diodes (LED) or any other suitable electronic device or display mechanism. In one embodiment, as described in more detail below, the display device includes a touch-screen with an associated touch-screen controller. The display devices may be of any suitable configuration, such as a square, rectangle, elongated rectangle.

The display devices of the gaming device are configured to display at least one and preferably a plurality of game or other suitable images, symbols and indicia such as any visual representation or exhibition of the movement of objects such as mechanical, virtual or video reels and wheels, dynamic lighting, video images, images of people, characters, places, things and faces of cards, tournament advertisements and the like.

In one alternative embodiment, the symbols, images and indicia displayed on or of the display device may be in mechanical form. That is, the display device may include any electromechanical device, such as one or more mechanical objects, such as one or more rotatable wheels, reels or dice, configured to display at least one and preferably a plurality of game or other suitable images, symbols or indicia.

As illustrated in FIG. 2A, in one embodiment, the gaming device includes at least one payment acceptor 24 in communication with the processor. As seen in FIGS. 1A and 1B, the payment acceptor may include a coin slot 26 and a payment, note or bill acceptor 28, where the player inserts money, coins or tokens. The player can place coins in the coin slot or paper money, ticket or voucher into the payment, note or bill acceptor. In other embodiments, devices such as readers or validators for credit cards, debit cards or credit slips could be used for accepting payment. In one embodiment, a player may insert an identification card into a card reader of the gaming device. In one embodiment, the identification card is a smart card having a programmed microchip or a magnetic strip coded with a player's identification, credit totals and other relevant information. In one embodiment, money may be transferred to a gaming device through electronic funds transfer. When a player funds the gaming device, the processor determines the amount of funds entered and the corresponding amount is shown on the credit or other suitable display as described above.

As seen in FIGS. 1A, 1B and 2A, in one embodiment the gaming device includes at least one and preferably a plurality of input devices 30 in communication with the processor. The input devices can include any suitable device which enables the player to produce an input signal which is read by the processor. In one embodiment, after appropriate funding of the gaming device, the input device is a game activation device, such as a pull arm 32 or a play button 34 which is used by the player to start any primary game or sequence of events in the gaming device. The play button can be any suitable play activator such as a bet one button, a max bet button or a repeat the bet button. In one embodiment, upon appropriate funding, the gaming device begins the game play automatically. In another embodiment, upon the player engaging one of the play buttons, the gaming device automatically activates game play.

In one embodiment, as shown in FIGS. 1A and 1B, one input device is a bet one button 36. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game of the gaming device.

In one embodiment, one input device is a cash out button 38. The player may push the cash out button and cash out to receive a cash payment or other suitable form of payment corresponding to the number of remaining credits. In one embodiment, when the player cashes out, the player receives the coins or tokens in a coin payout tray 40. In one embodiment, when the player cashes out, the player may receive other payout mechanisms such as tickets or credit slips redeemable by a cashier or funding to the player's electronically recordable identification card.

In one embodiment, as mentioned above and seen in FIG. 2A, one input device is a touch-screen 42 coupled with a touch-screen controller 44, or some other touch-sensitive display overlay to allow for player interaction with the images on the display. The touch-screen and the touch-screen controller are connected to a video controller 46. A player can make decisions and input signals into the gaming device by touching touch-screen at the appropriate places.

The gaming device may further include a plurality of communication ports for enabling communication of the processor with external peripherals, such as external video sources, expansion buses, game or other displays, an SCSI port or a key pad.

In one embodiment, as seen in FIG. 2A, the gaming device includes a sound generating device controlled by one or more sounds cards 48 which function in conjunction with the processor. In one embodiment, the sound generating device includes at least one and preferably a plurality of speakers 50 or other sound generating hardware and/or software for generating sounds, such as playing music for the primary and/or secondary game or for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized for or to provide any appropriate information.

In one embodiment, the gaming machine may include a player or other sensor, such as a camera in communication with the processor (and possibly controlled by the processor) that is selectively positioned to acquire an image of a player actively using the gaming device and/or the surrounding area of the gaming device. In one embodiment, the camera may be configured to selectively acquire still or moving (e.g., video) images and may be configured to acquire the images in either an analog, digital or other suitable format. The display devices may be configured to display the image acquired by the camera as well as display the visible manifestation of the game in split screen or picture-in-picture fashion. For example, the camera may acquire an image of the player and that image can be incorporated into the primary and/or secondary game as a game image, symbol or indicia.

Gaming device 10 can incorporate any suitable wagering primary or base game. The gaming machine or device of the present invention may include some or all of the features of conventional gaming machines or devices. The primary or base game may comprise any suitable reel-type game susceptible to representation in an electronic or electromechanical form which produces a random outcome based on probability data upon activation from a wager.

In one embodiment, as illustrated in FIGS. 1A and 1B, a base or primary game is a slot game with a plurality of separate paylines 52. The paylines may be horizontal, vertical, circular, diagonal, angled or any combination thereof. In this embodiment, the gaming device displays at least one and preferably a plurality of reels 54, such as three to five reels 54 in video form with simulated reels and movement thereof. In one embodiment, an electromechanical slot machine includes a plurality of adjacent, rotatable wheels which may be combined and operably coupled with an electronic display of any suitable type. In another embodiment, the plurality of simulated video reels 54 are displayed on one or more of the display devices as described above. Each reel 54 displays a plurality of indicia such as bells, hearts, fruits, numbers, letters, bars or other images which preferably correspond to a theme associated with the gaming device. In this embodiment, the gaming device awards prizes when the reels of the primary game stop spinning if specified types and/or configurations of indicia or symbols occur on an active pay line or otherwise occur in a winning pattern.

In one embodiment, in addition to winning credits in a base or primary game, the gaming device may also give players the opportunity to win credits in a bonus or secondary game or bonus or secondary round. The bonus or secondary game enables the player to obtain a prize or payout in addition to the prize or payout, if any, obtained from the base or primary game. In general, a bonus or secondary game produces a significantly higher level of player excitement than the base or primary game because it provides a greater expectation of winning than the base or primary game and is accompanied with more attractive or unusual features than the base or primary game.

In one embodiment, the bonus or secondary game may be any type of suitable game, either similar to or completely different from the base or primary game. In one embodiment, the gaming device includes a program which will automatically begin a bonus round when the player has achieved a triggering event or qualifying condition in the base or primary game. In one embodiment, the triggering event or qualifying condition may be a selected outcome in the primary game or a particular arrangement of one or more indicia on a display device in the primary game, such as the number seven appearing on three adjacent reels along a payline in the primary slot game embodiment seen in FIGS. 1A and 1B. In another embodiment, the triggering event or qualifying condition may be by exceeding a certain amount of game play (number of games, number of credits, amount of time), reaching a specified number of points earned during game play or as a random award.

In one embodiment, once a player has qualified for a bonus game, the player may subsequently enhance his/her bonus game participation through continued play on the base or primary game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or geometric increase in the number of bonus wagering credits awarded. In one embodiment, extra bonus wagering credits may be redeemed during the bonus game to extend play of the bonus game.

In one embodiment, no separate entry fee or buy in for a bonus game need be employed. That is, a player may not purchase an entry into a bonus game; he must win or earn entry through play of the primary game and, thus, play of the primary game is encouraged. In another embodiment, qualification of the bonus or secondary game could be accomplished through a simple "buy in" by the player if, for example, the player has been unsuccessful at qualifying through other specified activities.

Figure 2B:
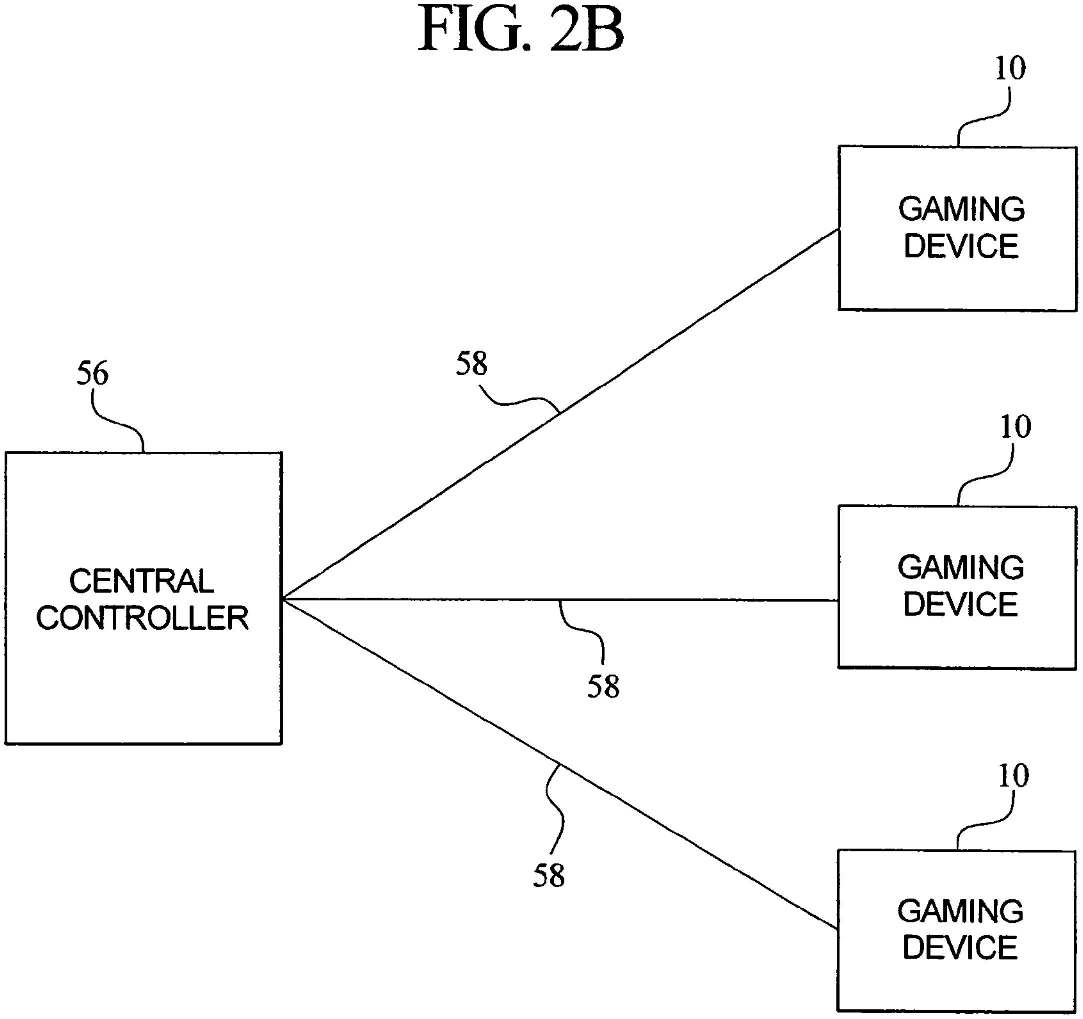
FIG. 2B is a schematic block diagram illustrating a plurality of gaming terminals and communication with a central controller.
Figure 3:
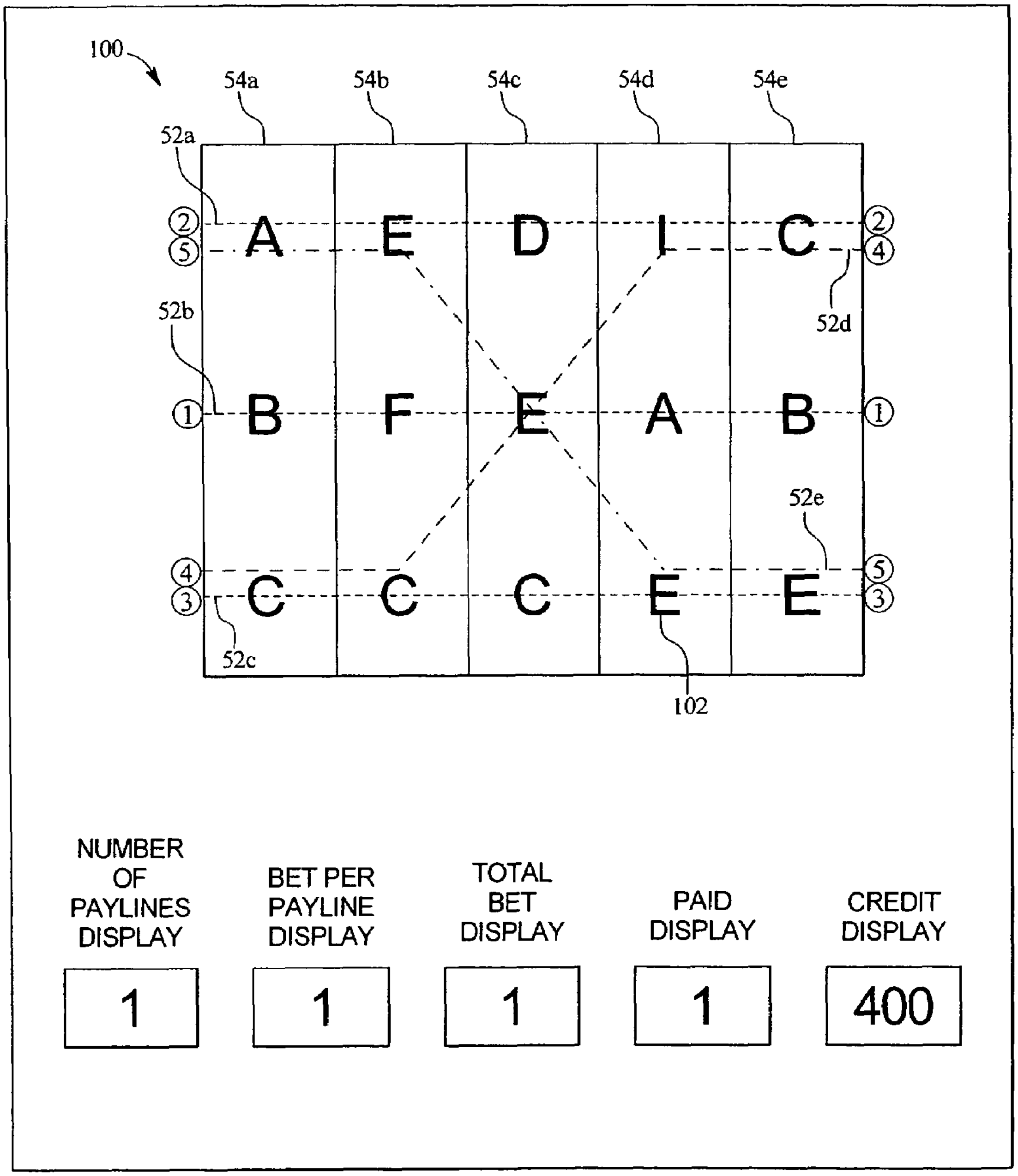
FIG. 3 (PRIOR ART)
FIG. 3 is a front elevation view of a conventional gaming device including five paylines associated with a set of reels.

In one embodiment, as illustrated in FIG. 2B, one or more of the gaming devices 10 of the present invention may be connected to each other through a data network or a remote communication link 58 with some or all of the functions of each gaming device provided at a central location such as a central server or central controller 56. More specifically, the processor of each gaming device may be designed to facilitate transmission of signals between the individual gaming device and the central server or controller.

In one embodiment, the game outcome provided to the player is determined by a central server or controller and provided to the player at the gaming device of the present invention. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes such a free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and preventing cheating or electronic or other errors, reducing or eliminating win-loss volatility and the like.

In another embodiment, one or more of the gaming devices of the present invention are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

A plurality of the gaming devices of the present invention are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system of the present invention may be substantially identical to the LAN gaming system described above, although the number of gaming devices in each system may vary relative to each other.

In another embodiment, the data network is an internet or intranet. In this embodiment, the operation of the gaming device can be viewed at the gaming device with at least one internet browser. In this embodiment, operation of the gaming device and accumulation of credits may be accomplished with only a connection to the central server or controller (the internet/intranet server) through a conventional phone or other data transmission line, digital signal line (DSL), T-1 line, coaxial cable, fiber optic cable, or other suitable connection. In this embodiment, players may access an Internet game page from any location where an internet connection and computer, or other internet facilitator are available. The expansion in the number of computers and number and speed of internet connections in recent years increases opportunities for players to play from an ever-increasing number of remote sites. It should be appreciated that enhanced bandwidth of digital wireless communications may render such technology suitable for some or all communications according to the present invention, particularly if such communications are encrypted. Higher data transmission speeds may be useful for enhancing the sophistication and response of the display and interaction with the player.

In another embodiment, a plurality of gaming devices at one or more gaming sites may be networked to a central server in a progressive configuration, as known in the art, wherein a portion of each wager to initiate a base or primary game may be allocated to bonus or secondary event awards. In one embodiment, a host site computer is coupled to a plurality of the central servers at a variety of mutually remote gaming sites for providing a multi-site linked progressive automated gaming system. In one embodiment, a host site computer may serve gaming devices distributed throughout a number of properties at different geographical locations including, for example, different locations within a city or different cities within a state.

In one embodiment, the host site computer is maintained for the overall operation and control of the system. In this embodiment, a host site computer oversees the entire progressive gaming system and is the master for computing all progressive jackpots. All participating gaming sites report to, and receive information from, the host site computer. Each central server computer is responsible for all data communication between the gaming device hardware and software and the host site computer.

Separately Displayed Paylines

One embodiment of the present invention is directed to a gaming device having a game including a plurality of displays of a same or single set of reels which separately and simultaneously display the symbols on each of the plurality of different paylines associated with the reels.

Figure 5A:
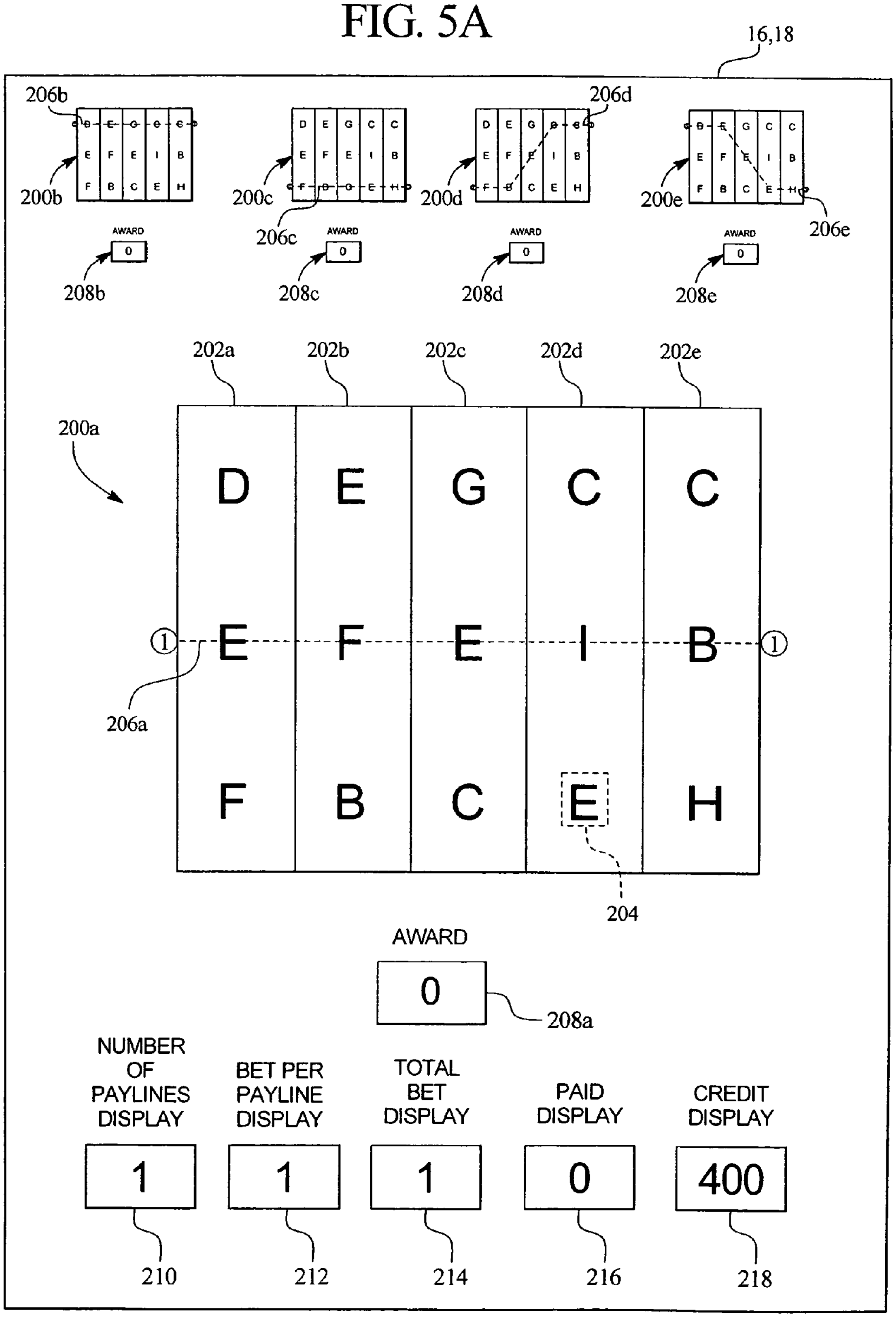
FIG. 5A is a front elevation view of one of the display devices of FIGS. 1A and 1B illustrating an example of one embodiment of the present invention where a sets of reels is separately and simultaneously displayed a plurality of times to display the same generated symbols and the different symbol combinations on the different paylines.

Referring to FIGS. 1A, 1B and 5A, in one embodiment of the present invention, one of the display devices 16, 18 displays a plurality of identical images of the set of reels such as reel set displays 200*a*, 200*b*, 200*c*, 200*d* and 200*e* to a player. Each of the reel set displays includes the same plurality of reels 202*a*, 202*b*, 202*c*, 202*d* and 202*e* as shown in FIG. 5A. Each of the reels includes at least one and preferably a plurality of symbol positions. In this embodiment, the reels include a plurality of symbols 204 which are the letters A, B, C, D, E, F, G, H and I. It should be appreciated that the reels may include any suitable symbols, characters or images as desired by the game implementor. In one embodiment, each of the symbol positions on the reels includes a predetermined or designated symbol from the plurality of symbols. In another embodiment, each of the symbol positions on the reels includes a randomly determined symbol from the plurality of symbols. It should be appreciated that any of the symbols may be in any of the symbol positions on the reels.

In one embodiment, the reel set displays are displayed on the same display device and configured or arranged in any suitable location or locations on the display device. In another embodiment, at least one of the reel set displays is displayed on a separate display device. It should be appreciated that the reel set displays including the different paylines may be displayed on the same display device or on different display devices. It should also be appreciated that any suitable number of display devices or display screens may be employed by the present invention to separately and simultaneously display the reel set in association with each different payline to a player.

In one embodiment, a plurality of different paylines, such as paylines 206*a*, 206*b*, 206*c*, 206*d* and 206*e* are associated with the reel set and are separately and simultaneously displayed in association with the reel set displays 200*a*, 200*b*, 200*c*, 200*d* and 200*e*, respectively. As illustrated in FIG. 5A, each of the reel set displays includes a different associated payline. In a game, the reel set is activated when the player presses the spin or activation button or pulls the pull arm. The reels in the reel set generate and display a plurality of symbols to the player. These displayed symbols are the same for each reel set display. The gaming device then provides any awards associated with winning symbol combinations indicated on the payline associated with each reel set display. By displaying each payline on a separate reel set display, the gaming device enables a player to quickly and easily view and determine the different symbol combinations on each of the paylines. As a result, the gaming device is more exciting and enjoyable for players because it is simpler to understand the winning combinations on each of the different paylines.

In the illustrated embodiment, the paylines extend horizontally across the reels or extend horizontally and diagonally across the reels. It should be appreciated that the paylines may be any suitable paylines, such as horizontally extending paylines, vertically extending paylines, diagonally extending paylines or any combination of these paylines. It should also be appreciated that any suitable number of reel set displays which each include a different payline may be employed in the present invention. It should further be appreciated that certain reel set displays may alternatively have more than one associated payline as long as the paylines are clear and don't become hard to distinguish.

In one embodiment, the gaming device provides an outcome, such as an award to a player when a designated combination of symbols, such as a winning combination of symbols, occurs or is indicated on any one or on a plurality of the paylines 206*a*, 206*b*, 206*c*, 206*d* and 206*e*. In one embodiment, the outcome includes one or more awards, prizes, credits, free spins, free games, game elements or any other suitable award or awards. It should be appreciated that the designated combination of symbols, or winning symbol combinations, may be a line pay, a line scatter pay, a reel scatter pay, or any suitable winning combination of the symbols. In one embodiment, at least two of the winning symbol combinations associated with each of the paylines are different. In another embodiment, all of the winning symbol combinations associated with each of the paylines is different. It should be appreciated that any suitable winning symbol combinations may be associated with one or more of the paylines.

In one embodiment, the gaming device includes a set of meters or displays used to display the salient information for the game, including the number of credits, number of paylines, amount bet per line, total bet and the amount paid to the player in the spin of the reels. If necessary, any number of meters may be added to further facilitate control of the games.

In one embodiment, the number of credits in the credit pool is displayed by a credit meter or credit display 218. The pool of credits increases and decreases according to the player's wins or losses in a game and may be supplemented, if necessary, by the player when the player deposits additional coins, tokens or paper currency into the gaming device.

In one embodiment, the number of pay lines wagered upon by the player in a game is displayed on a Number of Pay Lines meter or display 210. The pay lines are activated in a predetermined order, as follows: the first wager is applied to pay line 206*a*; the second wager is applied to pay line 206*b*; the third wager is applied to pay line 206*c*; the fourth wager is applied to pay line 206*d*; and the fifth wager is applied to pay line 206*e*. It should be appreciated that the a game may have two or more paylines and the paylines may be activated in any suitable order.

In one embodiment, the number of credits wagered on each pay line is displayed on a Bet Per Line display 212. In this embodiment, the same amount is wagered on each of the pay lines. Alternatively, In another embodiment the player could wager different amounts on each pay line, a plurality of the paylines or any suitable number of the paylines. The separate reel set displays can also separately and simultaneously display the amount of the wager on each of the paylines.

In one embodiment, the total number of credits bet on all of the pay lines is displayed by a Total Bet display 214. The total bet is calculated by multiplying the number of pay lines by the bet per line. In addition, the number of credits awarded for any winning symbol combinations occurring on the paylines is displayed by a Paid display 216. In one embodiment, if the player did not place a wager on a particular payline or paylines, the gaming device does not provide an award or awards for any winning symbol combinations occurring on those paylines. In another embodiment, the gaming device provides a consolation award or awards for any winning symbol combinations occurring on paylines which were not wagered upon by the player.

In one embodiment, all winning symbol combinations are defined by pay tables or award summary tables associated with a game such as the paytable illustrated in FIG. 4. The pay table defines the winning symbol combinations for a game such as the winning symbol combinations shown in column 114. The paytable also shows the awards associated with the designated winning symbol combinations such as the awards illustrated in column 116. Each symbol in a symbol position counts towards the total number of symbols on a pay line. In addition, a pay table may also define scatter awards for winning symbol combinations including symbols scattered anywhere on the reels. Alternatively, any pre-determined or designated arrangement of symbols may be defined as a winning symbol combination in a game and any suitable number of outcomes, awards or credits may be provided to a player for the winning symbol combinations.

EXAMPLE

Figure 5B:
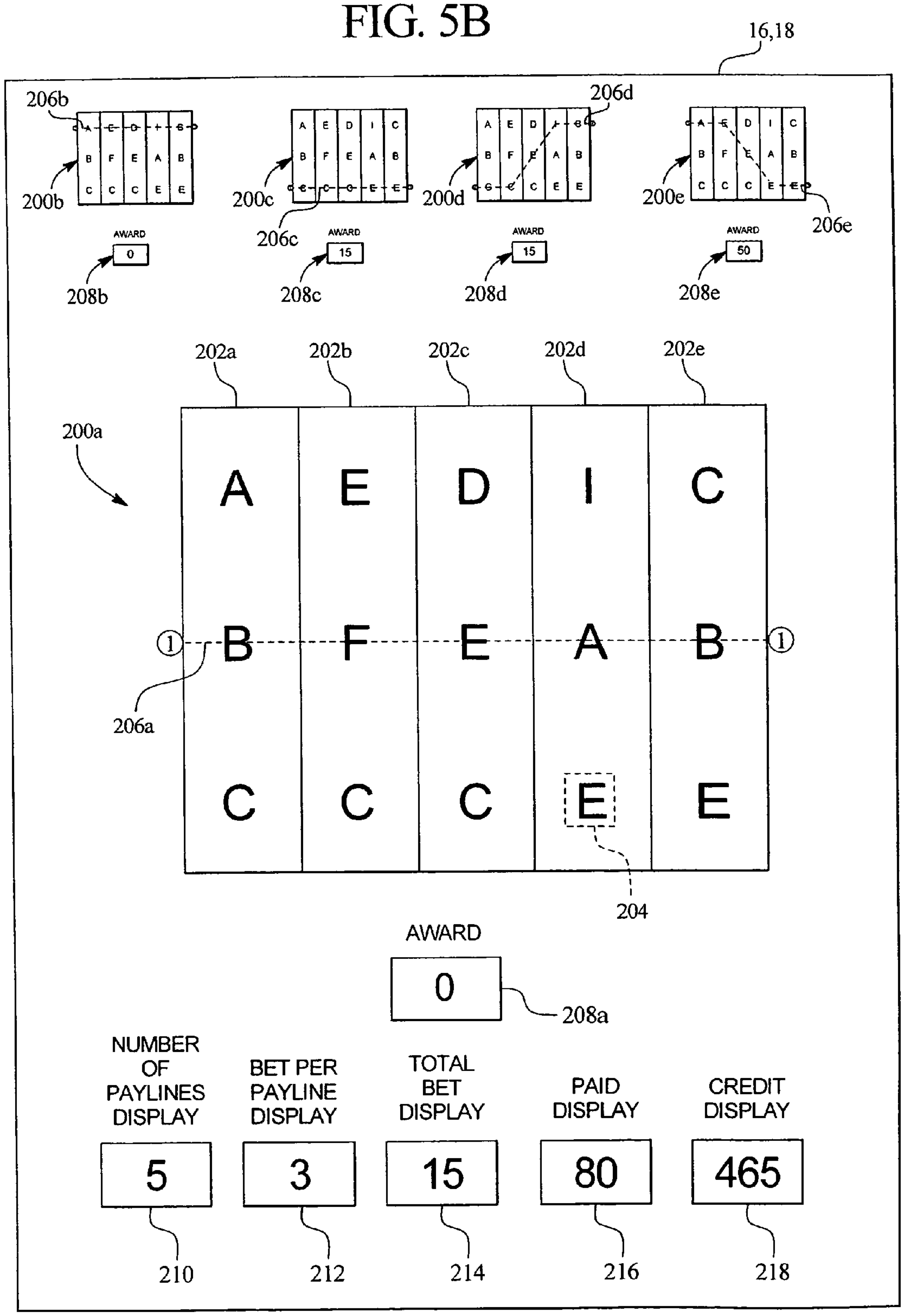
FIG. 5B is a front elevation view of the embodiment of FIG. 5A illustrating the symbol combinations indicated on the separately and simultaneously displayed different paylines associated with the set of reels after one activation of the set of reels.

Referring now to FIGS. 5A and 5B, an example of one embodiment of the present invention is illustrated where the gaming device includes a game having a plurality of identical displays of a set of reels, such as reel set displays 200*a*, 200*b*, 200*c*, 200*d* and 200*e*, as described above. A different payline is associated with the each of the reel set displays, such as paylines 206*a*, 206*b*, 206*c*, 206*d* and 206*e*, respectively. In this example, the gaming device displays five reel set displays each including a different payline. The gaming device also enables the player to place wagers on the paylines in sequential order. For example, the player's first wager is placed on payline one 206*a*, the player's second wager is placed on payline two 206*b*, the player's third wager is placed on payline three 206*c*, the player's fourth wager is placed on payline four 206*d* and the player's fifth and final wager is placed on payline five 206*e*. The reel set including payline one 206*a* is displayed on a relatively large reel set display 200*a* and in the middle of the display device because if the player only decides to make one wager in a spin, it will always be placed on payline one. Therefore, payline one is the most visible payline because it will always be wagered on when a player plays the gaming device. The remaining four reel set displays are smaller in size and displayed adjacent to and above reel set display 200*a*. It should be appreciated that the reel set displays may be any suitable size and displayed in any suitable position or location on the display device.

In this example, the player must obtain a designated combination of the symbols 204 on at least one of the paylines 206*a*, 206*b*, 206*c*, 206*d* or 206*e* to obtain an outcome such as an award in this spin. The paytable shown in FIG. 4 illustrates the designated winning symbol combinations in Column 114 and the corresponding awards in Column 116 for each spin. In this example, the winning symbol combinations may form a line pay or a scatter pay symbol combination as described above. For example, if three identical or matching symbols are indicated in adjacent symbol positions or in different symbol positions on a payline, the gaming device provides an award to the player. Additionally in this example, the gaming device displays the different meters or displays as described above.

Referring back to FIG. 5A, the player initially inserts currency into the game and obtains four hundred credits as indicated by the credit display 218. The player is now ready to begin playing the game. Because the game has not started yet, the paid display 110 indicates a zero or that the player has not received any awards or credits in the game.

Referring to FIG. 5B, the player begins playing the game by pressing the select paylines button four times to increase the number of paylines wagered in the game from one to five, as indicated by the number of paylines display 210. In this example, there are five paylines 206*a*, 206*b*, 206*c*, 206*d* and 206*e* associated with the reel set displays. Therefore, the player has wagered on the maximum number of paylines in the game. It should be appreciated that the player may wager on one or a plurality or all of the paylines in a game. The player then presses the bet per payline button to increase their bet or wager on each payline from one to three credits, as indicated by the bet per payline display 212. Therefore, the player is wagering three credits on each of the paylines 206*a*, 206*b*, 206*c*, 206*d* and 206*e*. Based on the wager made by the player in the spin or activation of the reels, the player has wagered a total bet or wager of fifteen, as indicated by the total bet display 214. The total bet equals the number of paylines wagered on by the player, which is five, multiplied by the amount bet per payline by the player, which is three. The total bet of fifteen made by the player in this activation or spin of the reels is subtracted from the player's total credit in the game or four hundred which results in the new total number of credits of three hundred eighty-five.

The player presses or activates the play button 34 or pull arm 32 (shown in FIGS. 1A and 1B) to activate or spin the reels in the game. The reels stop and display a plurality of symbols on the different paylines on each of the reel set displays 200*a*, 200*b*, 200*c*, 200*d* and 200*e*. In the present invention, when the player presses or activates the play or pull button, all of the reels in the reel set spin to indicate the same symbols which are displayed in association with the different paylines. In one embodiment, each of the reel set displays the reels moving at the same rate and indicates the same symbols in the same symbol positions of each of the symbol matrices associated with the reel set at the same time. It should be appreciated that one or more of the reel set displays may display the reels spinning at a different rate than one or more of the other reels in that reel set display or another reel set display. It should be appreciated that one, a plurality or all of the reel set displays may stop simultaneously, sequentially or in any suitable order. In this example, the reels simultaneously stop to display a plurality of symbols on the paylines associated with the reels of the reel set displays. Specifically, a winning symbol combination occurs or is indicated on paylines 206*c*, 206*d* and 206*e*. Payline 206*c* indicates three "C" symbols which are adjacent to each other and form a line pay combination. The three "C" symbols are located at symbol positions 1/3, 2/3 and 3/3. Each of the paylines 206*a*, 206*b*, 206*c*, 206*d* and 206*e* are associated with respective award displays 208*a*, 208*b*, 208*c*, 208*d* and 208*e*. According to the paytable shown in FIG. 4, a symbol combination including three "C" symbols provides an award of fifteen. Thus, award display 208*c* indicates an award of fifteen.

A winning symbol combination is also indicated on payline 206*d* associated with reel set display 200*d*. Payline 206*d* also indicates three "C" symbols. However, on this payline, the three "C" symbols are not adjacent to each other. Therefore, this winning symbol combination is a scatter pay combination. The three "C" symbols indicated on payline 206*d* are located at symbol positions 1/3, 2/3 and 5/1. As described above, a winning symbol combination including three "C" symbols provides an award of fifteen as indicated by the paytable shown in FIG. 4. The player also obtained an award for a winning symbol combination indicated on payline 206*e* in reel set display 200*e*. A winning combination of four "E" symbols is indicated on payline 206*e*. The four "E" symbols are adjacent to each other or form a line pay combination and are located at symbol positions 2/1, 3/2, 4/3 and 5/3. According to the paytable, a winning symbol combination including four "E" symbols provides an award of fifty. Accordingly, the awards of fifteen, fifteen and fifty are indicated by the award displays 208$c$, 208$d$ and 208$e$ associated with the reel set displays 200$c$, 200$d$ and 200$e$, respectively.

In this example, the gaming device provides the cumulative or sum of all of the awards obtained from each of the reel set displays 200 in a spin. The total award for this spin is therefore the combination or sum of the awards of fifteen, fifteen and fifty, which is eighty. The gaming device indicates the total award of eighty in the paid display 216. The total award of eighty is added to the player's previous total number of credits which was three hundred eighty-five to give the player a new total number of credits of four hundred sixty-five, as indicated by the credit display 218.

In this example, the gaming device provides awards for each winning symbol combination indicated on the paylines associated with the reels set displays. In another embodiment, the gaming device only provides the largest award associated with any of the winning symbol combinations indicated on the reel set displays. It should be appreciated that the gaming device may provide one, a plurality or all of the awards associated with winning symbol combinations indicated on the paylines associated with the reel set displays.

In this example, the player decides not to continue playing the gaming device and therefore presses the cashout button to receive the total number of credits of four hundred sixty-five as indicated by the credit display 218. It should be appreciated that the gaming device may issue the credits in the form of currency (i.e., cash or coins), a ticket, an electronic payment, a voucher or any other suitable form of payment.

As is evident by the above example, the present invention enables players to easily and quickly view the paylines wagered on in a spin to determine if any winning symbol combinations are indicated by the paylines. This makes the game more enjoyable and exciting for players because the players can see the different symbol combinations that occur on each of the paylines in each spin of the reels.

Figures 6, 6A:
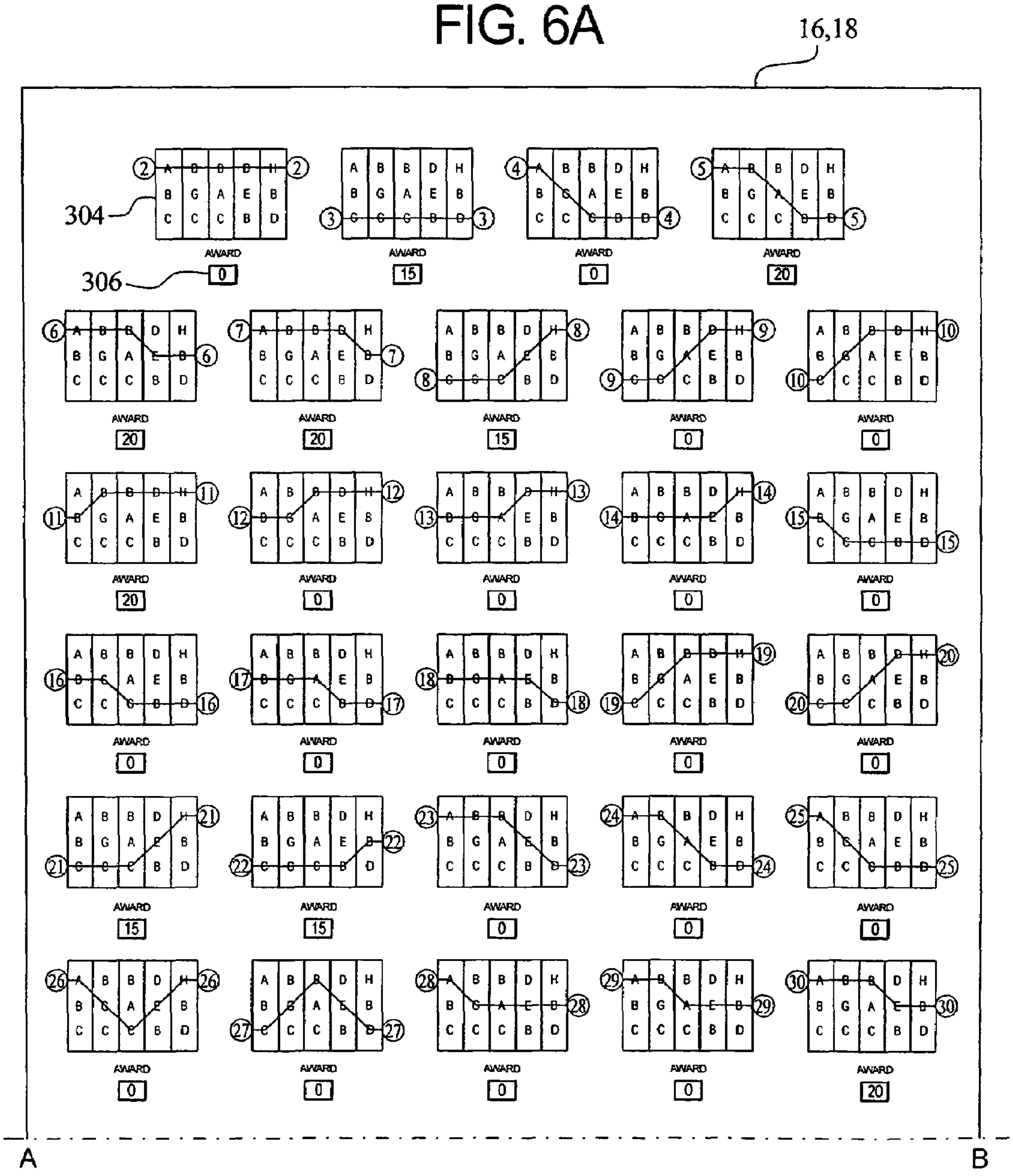
FIG. 6 which is divided into
FIGS. 6A and 6B is an illustration of one display device displaying the set of reels fifty-eight times and the different payline for each display of the reels.
Figure 6B:
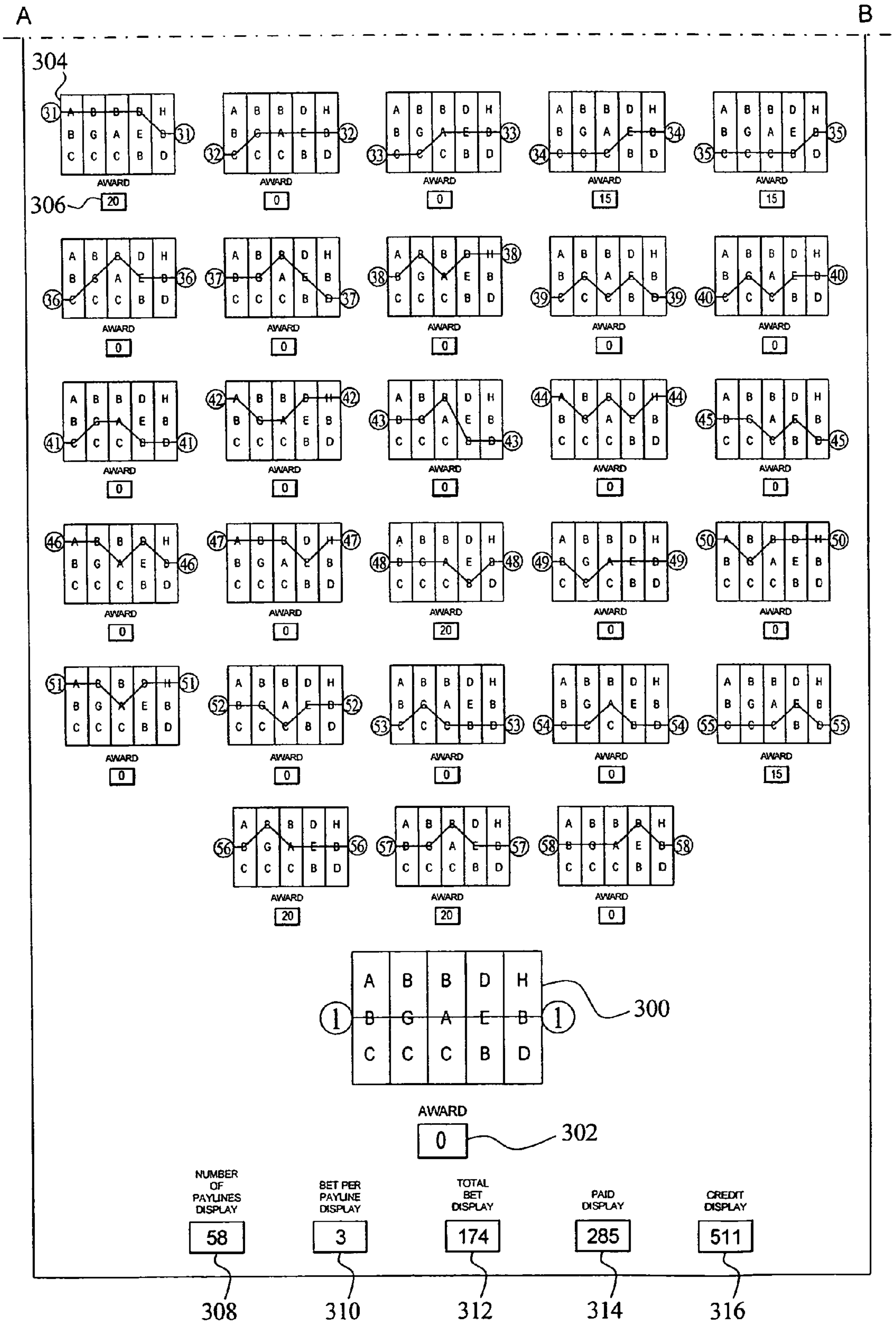

Referring now to FIG. 6 which is divided into FIGS. 6A and 6B, another example of the present invention is illustrated where a gaming device includes fifty-eight different paylines. In this example, fifty-eight separate reel set displays 304 are displayed to a player where the each reel set display includes a different one of the fifty-eight paylines. Each of the reel set displays also includes an award display or award meter, such as 302 and 306, to indicate the award provided for any winning symbol combinations on each of the paylines associated with the reels sets.

As described above, conventional slot machines display all paylines on a single set of reels. As a result, players have great difficulty determining whether they have obtained winning symbol combinations on one or more of the different paylines. The present invention simplifies and makes determining the winning symbol combinations on each of the paylines easier for a player by separately displaying each of the paylines on a separate display of the set of reels. In one embodiment, the first payline or the payline which the player's first wager is placed on, such as payline one, is larger and is displayed as the main payline as shown in FIG. 6. The other reel set displays, including the other paylines, are shown as smaller displays and positioned adjacent to or above the main reel set 300. It should be appreciated that any number of reel set displays may be displayed to a player. It should also be appreciated that the reel set displays may be the same general size or all different sizes.

Referring to FIGS. 6A and 6B, the player initially inserts currency into the game and obtains four hundred credits. The player is now ready to begin playing the game. The player begins playing the game by pressing the select paylines button four times to increase the number of paylines wagered in the game from one to fifty-eight, as indicated by the number of paylines display 308. In this example, there are fifty-eight paylines associated with the reel set displays 304. Therefore, the player has wagered on the maximum number of paylines in the game.

Next, the player presses the bet per payline button to increase their bet or wager on each payline from one to three credits, as indicated by the bet per payline display 310. Therefore, the player has wagered three credits on each of the fifty-eight paylines. Based on the wager made by the player in the spin or activation of the reels, the player has wagered a total bet or wager of one-hundred seventy-four, as indicated by the total bet display 312. The total bet equals the number of paylines wagered on by the player, which is fifty-eight, multiplied by the amount bet per payline by the player, which is three. The player begins this spin with zero credits. The total bet of one-hundred seventy-four made by the player in this activation or spin of the reels is subtracted from the player's total credit in the game or four hundred which results in the new total number of credits of two hundred twenty-six.

The player presses or activates the play button 34 or pull arm 32 (shown in FIGS. 1A and 1B) to separately and simultaneously activate or spin the reels in the game. The reels stop and display a plurality of symbols on the different paylines.

In this example, paylines two, five, six, seven, eight, eleven, twenty-one, twenty-two, thirty, thirty-one, thirty-four, thirty-five, forty-eight, fifty-five, fifty-six and fifty-seven indicate winning symbol combinations providing awards indicated by the award displays 306 associated with the different reel set displays 304. The awards are summed to provide a total award or cumulative award of two hundred eighty-five as indicated by the paid display 314. The total or cumulative award indicated by the paid display 314 is added to the player's present number of credits of two hundred twenty-six to give the player a new total number of credits of five hundred eleven as indicated by the credit display 316.

It should be appreciated that the gaming device may include any suitable number of reel set displays where one or more different paylines are associated with the reel set displays to separately and simultaneously display the symbols indicating each of the paylines to a player.

In another alternative embodiment, a primary reel set is displayed to the player on a display device. The primary reel set includes all of the paylines associated with the reels. The primary reel set is then replaced with a plurality of reel set displays as described above, which each separately and simultaneously display a different one of the paylines from the primary reel set.

In a further alternative embodiment, the gaming device provides bonus or additional awards or payouts for certain events occurring on one or more of the different paylines. In one aspect of this embodiment, the gaming device provides a bonus or additional award to a player when a designated number of winning symbol combinations (i.e. the paylines of twenty-six out of fifty-one of a plurality of paylines indicate winning symbol combinations) are indicated on the paylines. The designated number of winning symbol combinations may be predetermined, randomly determined or determined according to any suitable determination method. In another aspect, the gaming device provides a bonus or additional award for winning symbol combinations occurring on the paylines in a specific location or configuration on the display device (i.e. all of the paylines associated with the reel set displays in one column, row or diagonal on the display device indicate winning symbol combinations). In another aspect of this embodiment, the gaming device provides an additional award when a designated percentage of the reel set displays indicate winning symbol combinations (i.e., fifty percent of the reels set displays). As described above, the designated number of winning symbol combinations may be predetermined, randomly determined or determined according to any suitable determination method. In a further aspect, the gaming device provides an input device or selector that enables a player to select one or more of the reel set displays or paylines prior to activating the reel set. The gaming device provides an additional award to the player when one or more of the reel set displays or paylines selected by the player indicate winning symbol combinations in a spin. The players selections may remain selected for one spin or a plurality of spins.

In another alternative embodiment, the gaming device provides a bonus or additional award for bonus features such as wild symbols and scatter pay combinations. Wild symbols replace any or all other symbols in determining winning outcomes. Alternatively, wild symbols may only replace limited subsets of the other symbols. Wild symbols, therefore, increase the possibility of a player achieving winning combinations. In a preferred embodiment of the present invention, the wild symbol replaces every other symbol on the reels in the reel set. Alternatively, any suitable replacement rules for wild symbols could be employed.

In one embodiment, the wild symbols are used to affect the payouts based on one or more wild symbols. For example, a wild symbol indicated in a winning combination of symbols, may double the value of the winning combination. The slot game can also be configured so that the wild symbols increase or decrease the value of any payout in any manner which results in an average value that can be utilized to control the gaming machine's overall average payouts. In one embodiment of the present invention, the wild symbols do not affect the value of the winning symbol combinations.

In another alternative embodiment, a scatter pay or scatter pay combination of the symbols provides a bonus or additional award to the player. In one embodiment, a scatter pay or scatter pay combination provides a specific number of credits and/or triggers a bonus feature, such as entertaining animations, free spins, enhanced pay table values, and/or selection of bonus objects. The number of credits awarded may be determined by multiplying the total amount wagered by a random number within a predetermined range of numbers; or the number of free spins awarded may be set by the number of scatter symbols displayed on the reels. Alternatively, the value of the bonus feature could be determined by any other suitable calculation as long as the bonus feature results in an average value that can be utilized to control the overall average payouts of the slot game.

It should be appreciated that wild symbols and scatter pay combinations do not necessarily result in the award of credits to a player. The activation of these bonus features may only result in a payout some percentage of the time. For example, wild symbols may appear on the screen without forming a winning symbol combination or scatter symbols may require the presence of another element, such as another special symbol to trigger the bonus award.

In one alternative preferred embodiment, the set of reels forms a symbol matrix such as a five column by three row symbol matrix. A plurality of different paylines are associated with the set of reels. In this embodiment, the entire set of reels is not displayed to the player. Instead, a plurality of reel displays or displays of the same set of reels are displayed to the player where each display forms a symbol matrix including one row of symbols. Each row of symbols in each of the displays is displayed along a horizontally extending payline and indicates the symbols occurring on each of the different paylines associated with the set of reels. For example, in a game where a player wagered on three paylines, the gaming device displays the symbols occurring on payline one on the first display, the symbols occurring on payline two on the second display and the symbols occurring on payline three on the third display. It should be appreciated that one, a plurality or all of the paylines may be displayed as horizontally extending paylines, vertically extending paylines, diagonally extending paylines or any combination of these paylines.

Figure 7:
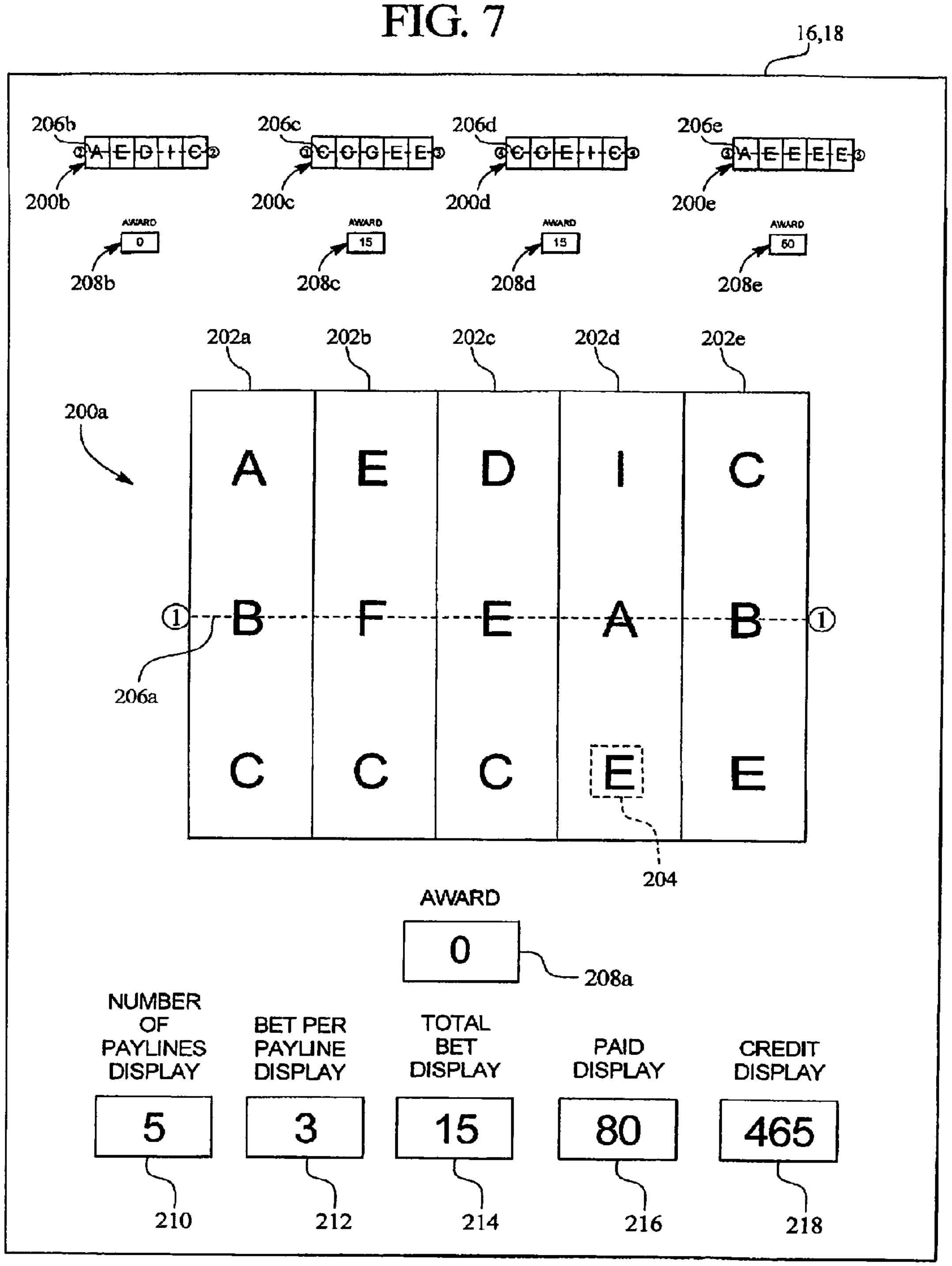
FIG. 7 is a front elevational view of an alternative display of the paylines and outcome illustrated in FIG. 5B, wherein the paylines are displayed as straight lines.

This embodiment is illustrated in FIG. 7 which includes the same reels, the same paylines, the same symbols and the same results as FIG. 5B. In this embodiment, the paylines 206*b*, 206*c*, 206*d* and 206*e* are displayed as straight lines and the symbols which occur on those lines are displayed along the straight paylines.

Figure 8:
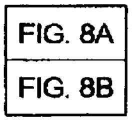
FIG. 8 is divided into FIGS. 8A and 8B and is an illustration of one display device displaying the paylines of FIGS. 6A and 6B as straight lines.
Figure 8A:
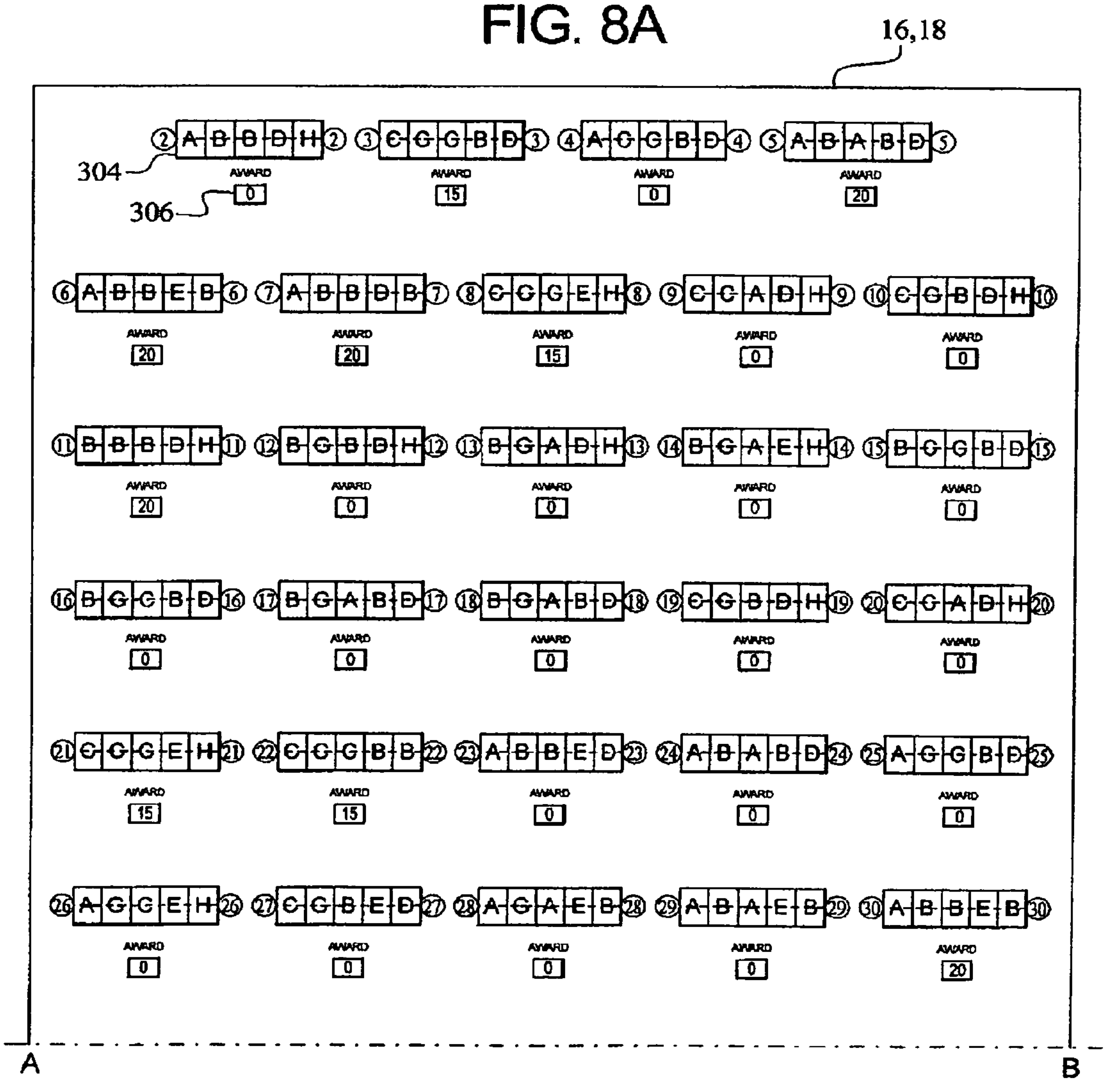
Figure 8B:
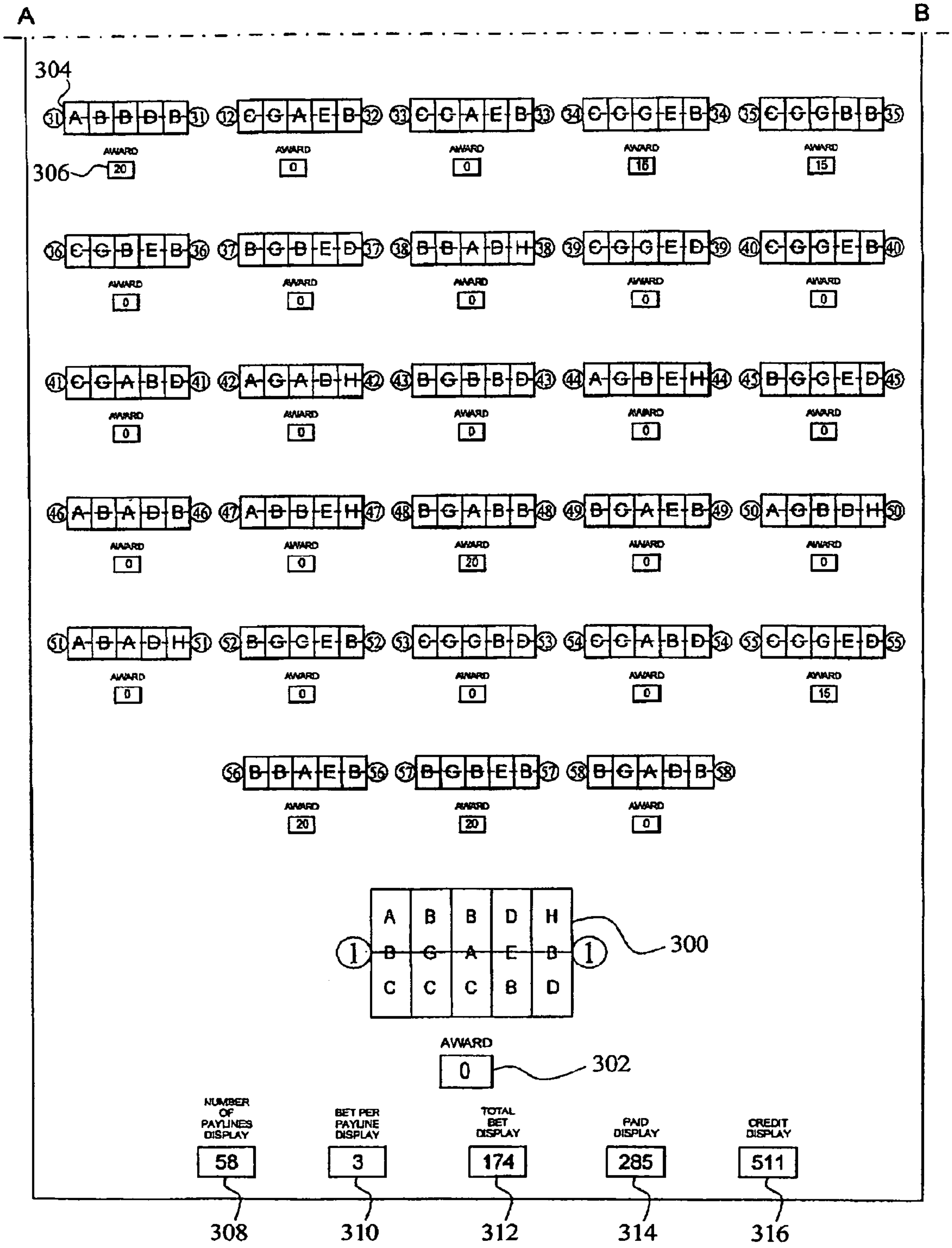

This embodiment is also illustrated in FIGS. 8A and 8B which include the same reels, the same paylines, the same symbols and the same results as FIGS. 6A and 6B. In this embodiment, paylines 1 to 58 are all displayed as straight lines and the symbols which occur on those lines are displayed along the straight paylines.

It should be appreciated that the player will win an award if a winning outcome occurs on a payline wagered upon by the player. Additionally, even if the player does not wager on all of the paylines, one embodiment of the present invention displays the combinations of symbols which occur on each payline. These non-wagered upon paylines can be indicated to the player in a different manner as is well known in the art.

While the present invention is described in connection with what is presently considered to be the most practical and preferred embodiments, it should be appreciated that the invention is not limited to the disclosed embodiments, and is intended to cover various modifications and equivalent arrangements included within the spirit and scope of the claims. Modifications and variations in the present invention may be made without departing from the novel aspects of the invention as defined in the claims, and this application is limited only by the scope of the claims.

The invention is claimed as follows:

1. A gaming device comprising:

a cabinet;

at least one display device mounted to the cabinet; and at least one processor programmed to operate with the at least one display device for each play of a game to:

(a) separately and simultaneously display both of:

(i) a reel display of a set of reels, said reel display associated with one of a plurality of paylines, and (ii) a plurality of additional reel displays, wherein each of said additional reel displays includes a copy of said set of reels and is associated with a different one of said plurality of paylines than said reel display;

(b) activate the set of reels of the reel display to generate and display a plurality of symbols based on a random determination and cause the reel display to identify a combination of symbols occurring on said payline associated with said reel display;

(c) display the same plurality of said symbols generated on the set of reels based on said same random determination on each of the additional reel displays and cause each additional reel display to identify a combination of symbols occurring on a different one of said plurality of paylines than said payline associated with said reel display; and (d) for each said payline that is wagered on, provide an award to a player based on any winning combination of symbols occurring on said payline.

2. The gaming device of claim 1, wherein the at least one processor is programmed to operate with the at least one display device to provide a total award to the player including the sum of all of the awards associated with the winning combinations of symbols occurring on the paylines.

3. The gaming device of claim 1, which includes a second display device mounted to the cabinet, wherein one of the reel displays of the reel display and the additional reel displays is displayed by said display device and other reel displays of the reel display and the additional reel displays are displayed by said display device.

4. The gaming device of claim 1, which includes a second display device mounted to the cabinet, wherein a plurality of the reel displays of the reel display and the additional reel displays are displayed by said display device and other reel displays of the reel display and the additional reel displays are displayed by said second display device.

5. The gaming device of claim 1, wherein the paylines include at least one payline selected from the group consisting of: a horizontally extending payline, a vertically extending payline, a diagonally extending payline and any combination of these paylines.

6. The gaming device of claim 1, wherein said at least one processor is programmed to operate with said at least one display device to provided a bonus award to the player when a designated number of winning combinations of the symbols occur on the paylines.

7. The gaming device of claim 6, wherein the designated number of winning combinations is pre-determined by said at least one processor.

8. The gaming device of claim 6, wherein the designated number of winning combinations is randomly determined by said at least one processor.

9. The gaming device of claim 1, wherein said at least one processor is programmed to operate with said at least one display device to provide a bonus award to the player when winning combinations of the symbols occur on a designated percentage of the paylines.

10. The gaming device of claim 9, wherein the designated percentage is pre-determined by said at least one processor.

11. The gaming device of claim 9, wherein the designated percentage is randomly determined by said at least one processor.

12. The gaming device of claim 1, which includes a selector controlled by the processor, said selector adapted to enable the player to select at least one of the reel displays of the reel display and the additional reel displays.

13. The gaming device of claim 12, wherein said at least one processor is programmed to operate with said at least one display device to provide a bonus award to the player when a winning combination of the symbols occurs on the payline of at least one of said reel displays of the reel display and the additional reel displays selected by the player.

14. The gaming device of claim 12, wherein said at least one processor is programmed to operate with said at least one display device to provide a bonus award to the player when a winning combination of the symbols occurs on the payline of all of said reel displays of the reel display and the additional reel displays selected by the player.

15. The gaming device of claim 1, wherein said at least one processor is programmed to operate with said at least one display device to individually display the award associated with each of the winning combination of symbols which occur on the paylines.

16. The gaming device of claim 15, wherein the at least one display device displays said awards in association with the paylines on which said winning combination of the symbols occur.

17. A method of operating a gaming device including at least one display device and at least one processor, said method comprising for each play of a game:

(a) separately and simultaneously displaying via the at least one display device both of:

(i) a reel display of a set of reels, said reel display associated with one of a plurality of paylines, and (ii) a plurality of additional reel displays, said additional reel displays each including a copy of said set of reels and associated with a different one of said plurality of paylines than said reel display;

(b) causing the at least one processor to operate with the at least one display device to activate the set of reels of the reel display to generate and display a plurality of the symbols based on a random determination;

(c) displaying a combination of symbols occurring on the payline associated with the reel display via the at least one display device;

(d) displaying the same plurality of symbols generated on the set of reels based on said same random determination on each of the additional reel displays via the at least one display device;

(e) displaying a combination of symbols occurring on the payline associated with each of the respective additional reel displays via the at least one display device; and (f) for each said payline that is wagered on, providing an award to a player based on any winning combination of symbols occurring on said payline.

18. The method of claim 17, which includes providing a total award including the sum of all of the awards associated with winning combinations of symbols occurring on the paylines.

19. The method of claim 17, which includes displaying the reel displays on at least two display devices.

20. The method of claim 17, wherein the paylines include at least one payline selected from the group consisting of: a horizontally extending payline, a vertically extending payline, a diagonally extending payline and any combination of these paylines.

21. The method of claim 17, which includes providing a bonus award to the player when a designated number of winning combinations of the symbols occur on the paylines.

22. The method of claim 21, wherein the designated number of winning combination are predetermined.

23. The method of claim 21, which includes causing the at least one processor to randomly determine the designated number of winning combinations.

24. The method of claim 17, which includes providing a bonus award to the player when a designated percentage of the paylines indicate a winning combination of the symbols.

25. The method of claim 24, wherein the designated percentage is predetermined.

26. The method of claim 24, which includes causing the at least one processor to randomly determine the designated percentage.

27. The method of claim 17, which includes providing a selector controlled by the at least one processor, wherein said selector enables the player to select at least one of the reel displays of the reel display and the additional reel displays.

28. The method of claim 27, which includes providing a bonus award to the player when a winning combination of the symbols occurs on the payline of at least one of said reel displays of the reel display and the additional reel displays selected by the player.

29. The method of claim 27, which includes providing a bonus award to the player when a winning combination of the symbols occurs on the payline of all of said reel displays of the reel display and the additional reel displays selected by the player.

30. The method of claim 17, which includes individually displaying the award associated with each of the winning combination of symbols which occur on the paylines via the at least one display device.

31. The method of claim 30, which includes displaying said awards in association with the respective paylines on which said winning combination of the symbols occur via the at least one display device.

32. The method of claim 17, which includes operating the gaming device through a data network.

33. The method of claim 32, wherein the data network is an internet.

34. The method of claim 17, wherein the gaming device includes at least one memory device storing a plurality of instructions for implementing the steps.

35. A gaming device operable under control of at least one processor, the gaming device comprising:

a cabinet;

at least one display device mounted to the cabinet; and said at least one processor programmed to operate with the at least one display device to for each play of a game:

(a) activate a set of reels to generate and display a plurality of symbols based on a random determination;

(b) display one of a plurality of different paylines in association with the randomly generated plurality of symbols at the set of reels;

(c) display a plurality of copies of said set of reels separately and simultaneously, wherein each of the copies of said set of reels includes the plurality of symbols generated and displayed based on the same random determination; and (d) for each of the copies of said set of reels, display a different one of the plurality of different paylines in association with the same randomly generated and displayed plurality of symbols than the payline displayed in association with the set of reels.

36. A gaming system comprising:

at least one display device configured to display a game operable upon a wager, said game including:

(i) a set of reels including a plurality of reels, (ii) a plurality of symbols on the reels, a plurality of the symbols being different, and (iii) a plurality of different paylines associated with the reels; at least one input device; and at least one processor programmed to operate with the at least one display device and the at least one input device for each play of the game to:

(a) cause the set of reels to display a plurality of randomly generated symbols of the plurality of symbols, and indicate a combination of symbols occurring on one of the plurality of different paylines, and (b) simultaneously and separately cause the display of a plurality of copies of the set of reels, each copy having the same randomly generated symbols displayed as the set of reels based on said randomly generated symbols, and indicate a combination of symbols occurring on a different one of the plurality of different paylines than the payline indicated on the set of reels.

37. The gaming system of claim 36, wherein the at least one processor is programmed to operate with the at least one display device to display a total award including the sum of any awards associated with winning combinations of the symbols occurring on the paylines.

38. The gaming of claim 36, wherein the at least one processor is programmed to operate with the at least one display device to display an award including the sum of any awards associated with winning combinations of the symbols occurring on the paylines.

39. The gaming system of claim 36, wherein said at least one processor is programmed to operate with the at least one display device to, for each copy of the set of reels, individually display any award associated with a winning combination of the symbols occurring on the payline associated with said copy.

40. The gaming system of claim 36, wherein said plurality of copies of the set of reels are arranged in an order according to which of said plurality of different paylines each respective copy is associated with.

41. The gaming system of claim 40, wherein each of said plurality of different paylines is associated with a number and said copies are displayed in order by number.

42. A gaming system comprising:

at least one display device configured to display a game operable upon a wager, said game including:

(i) a set of reels including a plurality of reels, (ii) a plurality of symbols on the reels, a plurality of the symbols being different, and (iii) a plurality of different paylines associated with the reels;

at least one input device; and at least one processor programmed to operate with the at least one display device and the at least one input device for each play of the game to:

(a) separately and simultaneously display both of:

(i) a reel display of the set of reels, and (ii) for each of the plurality of different paylines, a separate payline display area separate from the set of reels;

(b) cause the set of reels to display a plurality of randomly generated symbols of the plurality of symbols, and (c) simultaneously and separately, for each wagered on payline on which there is a winning symbol combination resulting from said random generation, cause a display of the symbols of the winning symbol combination at the respective separate payline display area of said payline.

43. A method operating a gaming system including at least one display device and at least one processor, the method comprising for each play of a wagering game:

(a) separately and simultaneously displaying via the at least one display device both of:

(i) a reel display of a set of reels, and (ii) for each of a plurality of different paylines, a separate payline display area separate from the set of reels;

(b) causing the set of reels to display via the at least one display device a plurality of randomly generated symbols of a plurality of symbols, and (c) simultaneously and separately, for each wagered on payline on which there is a winning symbol combination resulting from said random generation, causing a display via the at least one display device of the symbols of the winning symbol combination at the respective separate payline display area of said payline.

* * * * *

UNITED STATES PATENT AND TRADEMARK OFFICE

CERTIFICATE OF CORRECTION

PATENT NO. : 7,625,280 B2
APPLICATION NO. : 10/777011
DATED : December 1, 2009
INVENTOR(S) : Singer et al.

It is certified that error appears in the above-identified patent and that said Letters Patent is hereby corrected as shown below:

IN THE CLAIMS:

In Claim 12, Column 19, line 43, insert --at least one-- between "the" and "processor".

In Claim 15, Column 19, line 62, replace "combination" with --combinations--.

In Claim 16, Column 19, line 66, replace "combination" with --combinations--.

In Claim 22, Column 20, line 44, replace "combination" with --combinations--.

In Claim 30, Column 21, line 6, replace "combination" with --combinations--.

In Claim 31, Column 21, line 10, replace "combination" with --combinations--.

Signed and Sealed this

Tenth Day of August, 2010

David J. Kappos

*Director of the United States Patent and Trademark Office*

UNITED STATES PATENT AND TRADEMARK OFFICE

CERTIFICATE OF CORRECTION

PATENT NO. : 7,625,280 B2
APPLICATION NO. : 10/777011
DATED : December 1, 2009
INVENTOR(S) : Singer et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1069 days.

Signed and Sealed this

Twenty-sixth Day of October, 2010

David J. Kappos

*Director of the United States Patent and Trademark Office*